US00RE47224E

(19) United States
(12) Reissued Patent
Taniguchi et al.

(10) Patent Number: US RE47,224 E
(45) Date of Reissued Patent: Feb. 5, 2019

(54) ELECTRONIC DEVICE, CONTROLLING METHOD THEREOF, CONTROLLING PROGRAM THEREOF, AND RECORDING MEDIUM

(71) Applicant: FUJITSU LIMITED, Kawasaki-shi, Kanagawa (JP)

(72) Inventors: Hironobu Taniguchi, Kawasaki (JP); Kenetsu Furuki, Kawasaki (JP); Yoko Fujii, Kawasaki (JP); Yuko Nakajima, Kawasaki (JP); Makoto Sugimoto, Kawasaki (JP)

(73) Assignee: FUJITSU CONNECTED TECHNOLOGIES LIMITED, Kawasaki (JP)

(21) Appl. No.: 14/687,794

(22) Filed: Apr. 15, 2015

Related U.S. Patent Documents

Reissue of:
(64) Patent No.: 8,421,825
Issued: Apr. 16, 2013
Appl. No.: 11/699,072
Filed: Jan. 29, 2007

(30) Foreign Application Priority Data

Sep. 22, 2006 (JP) ..... 2006-257322

(51) Int. Cl.
*G09G 5/00* (2006.01)
*G06F 1/16* (2006.01)
*H04M 1/02* (2006.01)

(52) U.S. Cl.
CPC ..... *G06F 1/1622* (2013.01); *G06F 1/1677* (2013.01); *G06F 1/1679* (2013.01);
(Continued)

(58) Field of Classification Search
CPC ..... G06F 1/1622; G06F 1/62; G06F 1/1624; H04M 1/021; H04M 1/0243
(Continued)

(56) References Cited

U.S. PATENT DOCUMENTS 5,661,632 A * 8/1997 Register ..... G06F 1/1626 345/905
5,798,750 A * 8/1998 Ozaki ..... 345/656
(Continued)

FOREIGN PATENT DOCUMENTS

CN 1691528 A 11/2005
CN 1748216 A 3/2006
(Continued)

OTHER PUBLICATIONS

Japanese Office Action dated Mar. 27, 2012, issued in corresponding Japanese Patent Application No. 2006-257322, with English Translation.

(Continued)

*Primary Examiner* — John M Hotaling
(74) *Attorney, Agent, or Firm* — Westerman, Hattori, Daniels & Adrian, LLP

(57) ABSTRACT

A plurality of screen aspects is acquired; each screen layout is optimized; switching of the screen aspects is supported; and visibility and functionality of the display screen are improved. An electronic device (portable terminal apparatus) including a display function in a rotatable and/or openable/closable case includes a displaying unit that displays a vertically elongated vertical screen or a horizontally elongated horizontal screen and a controlling unit (CPU) that changes screen layouts correspondingly to the vertical screen or the horizontal screen displayed on the displaying unit. The change in the screen layout corresponding to the vertical screen or the horizontal screen includes a change in arrangement of icons.

15 Claims, 31 Drawing Sheets

(52) U.S. Cl.
CPC ..... *G06F 2200/1614* (2013.01); *G06F 2200/1637* (2013.01); *H04M 1/021* (2013.01); *H04M 1/0214* (2013.01); *H04M 1/0233* (2013.01); *H04M 1/0245* (2013.01); *H04M 1/0247* (2013.01)

(58) Field of Classification Search
USPC ..... 345/659, 649, 655, 656
See application file for complete search history.

(56) References Cited

U.S. PATENT DOCUMENTS 5,973,664 A * 10/1999 Badger ..... 345/659
6,441,828 B1 * 8/2002 Oba et al. ..... 345/659
6,639,603 B1 * 10/2003 Ishii ..... 345/568
6,897,882 B1 * 5/2005 Kim ..... 345/659
7,142,195 B2 * 11/2006 Northway ..... G06F 1/1626 345/169
7,174,195 B2 2/2007 Nagamine
7,187,364 B2 * 3/2007 Duarte et al. ..... G06F 1/162 345/156
7,283,841 B2 * 10/2007 Luke ..... H04M 1/0208 348/333.02
7,339,600 B2 * 3/2008 Hwang ..... 345/659
7,522,947 B2 4/2009 Tsuda ..... G06F 1/162 379/433.12
7,636,748 B2 * 12/2009 Duarte et al. ..... 709/201
7,791,594 B2 * 9/2010 Dunko ..... G06F 1/1613 345/169
8,688,178 B2 * 4/2014 Kusano ..... G06F 1/162 455/575.3
8,797,267 B2 * 8/2014 Duarte ..... G06F 1/1624 345/169
2001/0004269 A1 * 6/2001 Shibata ..... H04M 1/021 348/333.06
2003/0064758 A1 * 4/2003 Mizuta et al. ..... H04M 1/0212 455/566
2003/0085870 A1 * 5/2003 Hinckley ..... G06F 1/1626 345/156
2003/0203747 A1 * 10/2003 Nagamine ..... H04M 1/0243 455/575.3
2004/0157647 A1 * 8/2004 Takahashi ..... H04M 1/021 455/566
2004/0198439 A1 10/2004 Kim et al. ..... H04M 1/021 455/556.1
2004/0203532 A1 * 10/2004 Mizuta ..... 455/90.3
2004/0214612 A1 * 10/2004 Park et al. ..... 455/566
2004/0223004 A1 * 11/2004 Lincke ..... G06F 1/1626 345/649
2004/0239792 A1 * 12/2004 Shibutani et al. ..... 348/333.12
2005/0068337 A1 * 3/2005 Duarte ..... G06F 1/162 345/649
2005/0079897 A1 * 4/2005 Nishijima ..... G06F 1/1616 455/575.1
2005/0091431 A1 * 4/2005 Olodort et al. ..... G06F 1/162 710/72
2005/0125570 A1 * 6/2005 Olodort et al. ..... 710/15
2005/0130715 A1 6/2005 Fujisawa
2005/0143124 A1 * 6/2005 Kennedy ..... G06F 1/1626 455/556.1
2005/0237298 A1 10/2005 Hwang
2006/0005156 A1 * 1/2006 Korpipaa ..... G06F 1/1613 717/100
2006/0077196 A1 * 4/2006 Watanabe ..... 345/204
2006/0183512 A1 * 8/2006 Segawa ..... G06F 1/162 455/575.1
2007/0004451 A1 * 1/2007 C. Anderson ..... G06F 1/1626 455/556.1

FOREIGN PATENT DOCUMENTS

JP 2003-319043 A 11/2003
JP 2004-228767 A 8/2004
JP 2005-124004 A 5/2005
JP 2006-148224 A 6/2006
JP 2008-017373 A 1/2008
KR 2004-85745 A 10/2004
WO 2003-056787 A1 7/2003
WO 2004/072867 A1 8/2004

OTHER PUBLICATIONS

The Korean Office Action dated Dec. 17, 2007 issued in corresponding Korean Patent Application No. 10-2007-0011791, with English Translation.
Chinese Office Action dated Oct. 16, 2009, issued in corresponding Chinese Patent Application No. 200710085820.5, with English Translation.

* cited by examiner

ELECTRONIC DEVICE, CONTROLLING METHOD THEREOF, CONTROLLING PROGRAM THEREOF, AND RECORDING MEDIUM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application is based upon and claims the benefit of priority from the prior Japanese Patent Application No. 2006-257322, filed on Sep. 22, 2006, the entire contents of which are incorporated herein by reference.

BACKGROUND OF THE INVENTION

1. Field of the Invention

The present invention relates generally to an electronic device such as a portable terminal apparatus including a display function in a rotatable and/or openable/closable case, and more particularly, to an electronic device that changes a display style such as a screen layout in response to rotation of a displaying unit, a controlling method thereof, a controlling program thereof, and a recording medium.

2. Description of the Related Art

In some conventionally known portable terminal apparatuses, cases of the portable apparatuses include folding and rotating functions, and a displaying unit and an input operation unit are included in different cases. In such a portable terminal apparatus disclosed in Japanese Patent Application Laid-Open Publication No. 2004-228767, a first case including a displaying unit is rotatable relative to a second case overlapping the first case in a closed state; if the first case is rotated clockwise relative to the second case, a first screen is displayed on the displaying unit; and if the first case is rotated counterclockwise relative to the second case, a second screen is displayed on the displaying unit (abstract, FIG. 7, etc.).

By the way, although two screen displays, i.e., vertical and horizontal screens can be achieved when the displaying unit is configured to be rotated to switch the normal vertical screen to the horizontal screen, since visibility is deteriorated if the vertical screen display is displayed on the horizontal, the visibility of the display contents is improved by rotating the display contents such as characters by 90 degrees. However, when the vertically elongated vertical screen display is normally used, if the vertical screen display is deployed on the horizontal screen, the display contents are vertically compressed, horizontally expanded, or generate a useless space, resulting in an inconvenient screen display, and benefits of the horizontal screen cannot be utilized. If the horizontally elongated horizontal screen display is normally used and is deployed on the vertical screen, the vertical screen is horizontally compressed, vertically expanded, or generates a useless space, which is inconvenient.

Japanese Patent Application Laid-Open Publication No. 2004-228767 does not disclose or indicate such needs and problems and does not disclose or indicate a configuration for solving the needs and problems, etc.

SUMMARY OF THE INVENTION

It is an object of the present invention to acquire a plurality of screen aspects and optimize each screen layout.

It is another object of the present invention to support switching of the screen aspects and improve visibility and functionality of the display screen.

To achieve the objects, the present invention relates to an electronic device such as a portable terminal apparatus including a display function in a rotatable and/or openable/closable case, and the displaying unit is, for example, disposed on a movable case and rotatable, includes a certain reference position as well as rightward and/or leftward rotated positions from the reference position, and can display different screen aspects such as a vertical screen or horizontal screen. By changing a screen layout depending on the screen aspect displayed on the displaying unit, the screen layout can be optimized and visibility and functionality of the displaying unit can be improved. If a different function is assigned to a screen aspect such as a vertical or horizontal screen, the different functions can be launched in response to the screen switching and a different function can be acquired for each screen, etc., resulting in improvements in functionality. Therefore, the objects are achieved.

In order to achieve the above objects, according to a first aspect of the present invention there is provided an electronic device including a display function in a rotatable and/or openable/closable case, the device comprising a displaying unit that displays a vertically elongated vertical screen or a horizontally elongated horizontal screen; and a controlling unit that changes screen layouts correspondingly to the vertical screen or the horizontal screen displayed on, the displaying unit.

Preferably, the electronic device comprises a sensor unit that detects the rotation or the opening/closing of the displaying unit, wherein the controlling unit switches the displaying unit to the vertical screen or the horizontal screen based on the rotation information or the open/close information acquired from the sensor unit. Preferably, the controlling unit sets a reference position and rotated positions or opened positions at a predetermined angle or more to the right and/or left for the displaying unit, and the screen form of the displaying unit is switched to the vertical screen or the horizontal screen at the reference position and the rotated positions or the opened positions. Preferably, the change in the screen layout corresponding to the vertical screen or the horizontal screen includes a change in arrangement of icons. Preferably, the controlling unit launches a function assigned to the vertical screen or the horizontal screen correspondingly to the vertical screen or the horizontal screen on the displaying unit. Preferably, the electronic device comprises a movable arm that is supported by a fixed case in an openable/closable manner; and a movable case that is rotatably supported by the movable arm, wherein the displaying unit is disposed on the movable case and is rotated or opened/closed. Preferably, One or both of the movable arm and the movable case include a sensor unit that detects the rotation or opening/closing of the movable case.

In order to achieve the above objects, according to a second aspect of the present invention there is provided a controlling method of an electronic device including a display function in a rotatable and/or openable/closable case, the method comprising the steps of displaying a vertically elongated vertical screen or a horizontally elongated horizontal screen; and changing screen layouts correspondingly to the vertical screen or the horizontal screen.

Preferably, the controlling method of an electronic device comprises the step of detecting the rotation or the opening/closing, wherein switching to the vertical screen or the horizontal screen is performed based on the rotation information or the open/close information. Preferably, the controlling method of an electronic device comprises the step of setting a reference position, and rotated positions or opened positions at a predetermined angle or more to the right and/or left and switching to the vertical screen or the horizontal screen at the reference position and the rotated positions or the opened positions. Preferably, in the controlling method of an electronic device, the change in the screen layout corresponding to the vertical screen or the horizontal screen includes a change in arrangement of icons. Preferably, the controlling method of an electronic device comprises the step of launching a function assigned to the vertical screen or the horizontal screen correspondingly to the vertical screen or the horizontal screen.

In order to achieve the above objects, according to a third aspect of the present invention there is provided a control program of an electronic device including a display function in a rotatable and/or openable/closable case, the program being executed by a computer, the program comprising the steps of displaying a vertically elongated vertical screen or a horizontally elongated horizontal screen; and changing screen layouts correspondingly to the vertical screen or the horizontal screen.

Preferably, the control program of an electronic device comprises the steps of detecting the rotation or the opening/closing, wherein switching to the vertical screen or the horizontal screen is performed based on the rotation information or the open/close information. Preferably, the control program of an electronic device comprises the step of setting a reference position, and rotated positions or opened positions at a predetermined angle or more to the right and/or left and switching to the vertical screen or the horizontal screen at the reference position and the rotated positions or the opened positions. Preferably, in the control program of an electronic device, the change in the screen layout corresponding to the vertical screen or the horizontal screen includes a change in arrangement of icons. Preferably, the control program of an electronic device comprises the step of launching a function assigned to the vertical screen or the horizontal screen correspondingly to the vertical screen or the horizontal screen.

In order to achieve the above objects, according to a fourth aspect of the present invention there is provided a recording medium storing a computer-readable control program of an electronic device including a display function in a rotatable and/or openable/closable case, the program being executed by a computer, the program comprising the steps of displaying a vertically elongated vertical screen or a horizontally elongated horizontal screen; and changing screen layouts correspondingly to the vertical screen or the horizontal screen.

Preferably, the program comprises the step of detecting the rotation or the opening/closing, wherein switching to the vertical screen or the horizontal screen is performed based on the rotation information or the open/close information. Preferably, the program comprises the step of setting a reference position, and rotated positions or opened positions at a predetermined angle or more to the right and/or left and switching to the vertical screen or the horizontal screen at the reference position and the rotated positions or the opened positions. Preferably, in the recording medium storing a computer-readable control program of an electronic device, the change in the screen layout corresponding to the vertical screen or the horizontal screen includes a change in arrangement of icons. Preferably, The program comprises the step of launching a function assigned to the vertical screen or the horizontal screen correspondingly to the vertical screen or the horizontal screen.

The features and advantages of the present invention are listed as follows.

(1) When the screen aspect is changed from the vertical screen to the horizontal screen, from the horizontal screen to the vertical screen, etc., the layout is changed for each screen and the screen configuration can be optimized to improve visibility and usability of the screen display.

(2) By differentiating the function that can be used in the vertical screen and the function that can be used in the horizontal screen in response to the screen switching between the vertical screen and the horizontal screen, functionality can be improved and specialties such as differences in visibility of the screens can be utilized.

Other objects, features, and advantages of the present invention will become more apparent by reference to the accompanying drawings and each embodiment.

DETAILED DESCRIPTION OF THE PREFERRED EMBODIMENTS

First Embodiment

Figure 1:
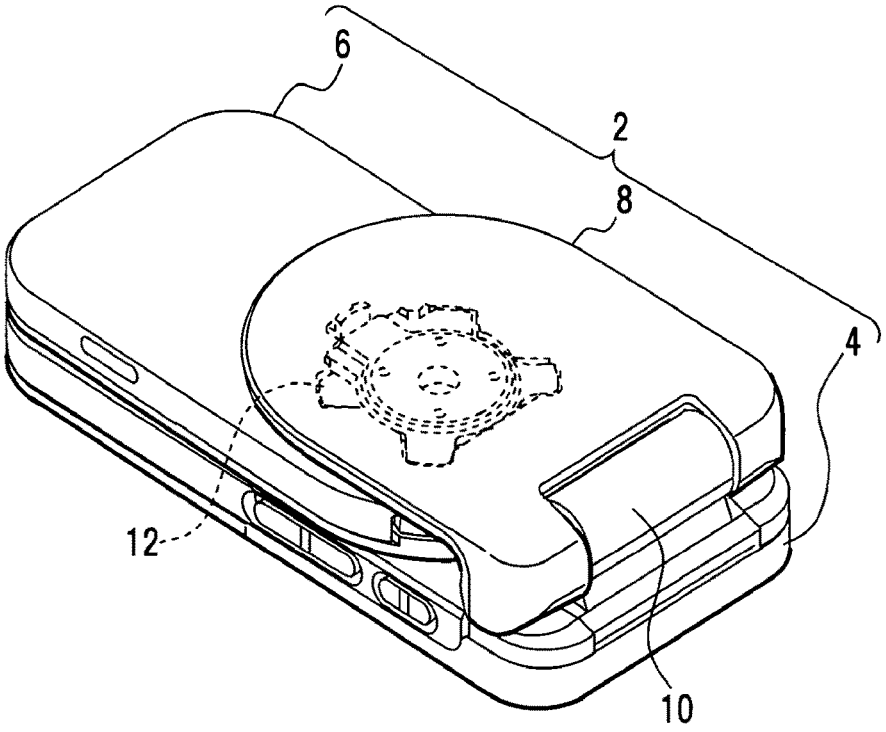
FIG. 1 is a perspective view of a portable terminal apparatus according to a first embodiment.
Figure 2:
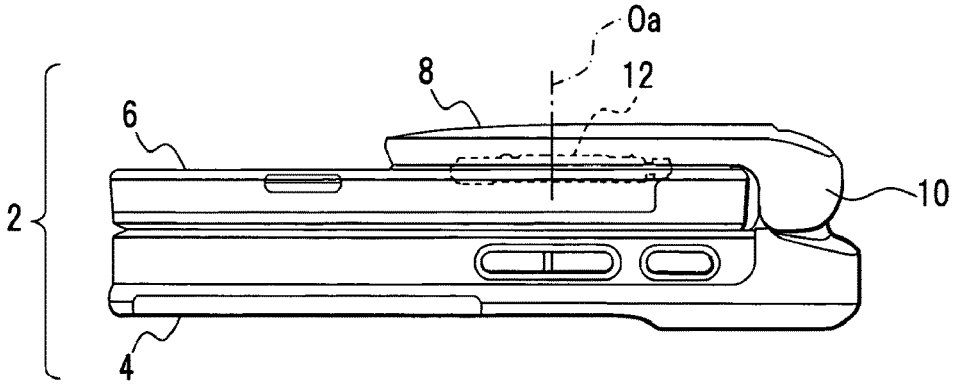
FIG. 2 is a side view of a closed state of the portable terminal apparatus.
Figure 3:
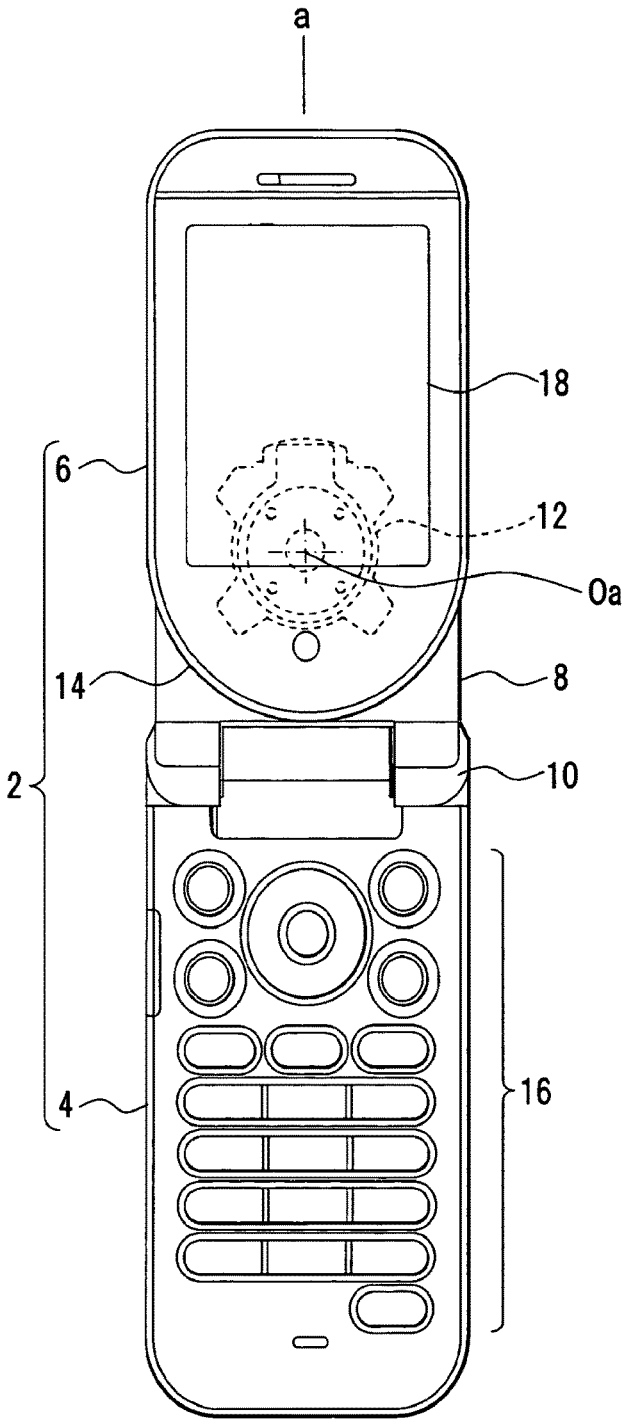
FIG. 3 is a front view of an opened state of the portable terminal apparatus.
Figure 4:
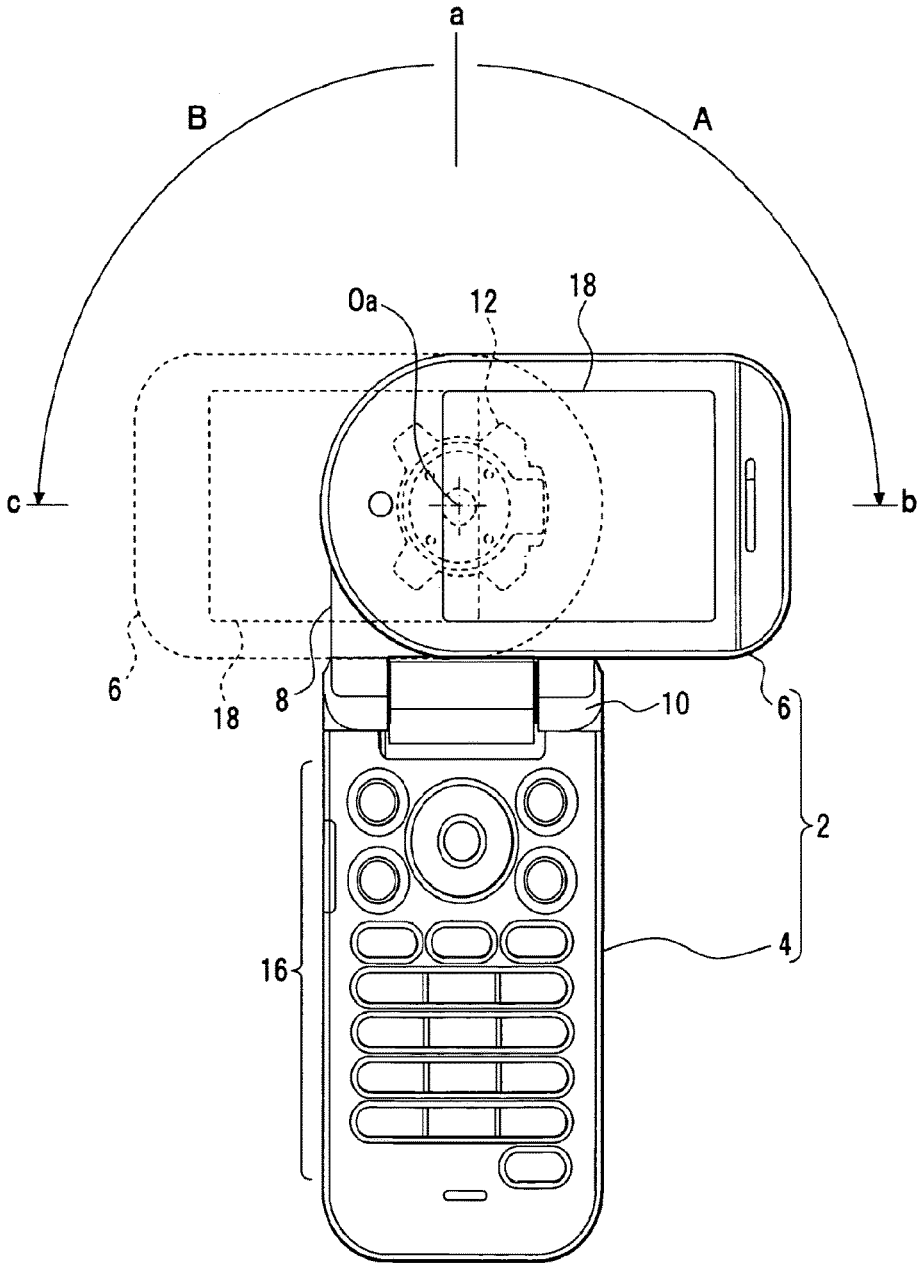
FIG. 4 depicts right rotation (left rotation) of a movable case of the portable terminal apparatus in the opened state.

A first embodiment of the present invention will be described with reference to FIGS. 1 to 4. FIG. 1 is a perspective view of a portable terminal apparatus; FIG. 2 is a side view of a closed state of the portable terminal apparatus; FIG. 3 is a front view of an opened state of the portable terminal apparatus; and FIG. 4 depicts right rotation (left rotation) of a movable case of the portable terminal apparatus in the opened state.

This portable terminal apparatus 2 is an example of a rotatable and/or openable/closable electronic device that includes a plurality of movable units such as an opening/closing unit and rotating units, and includes a fixed case 4 that is an operation-side case and a movable case 6 that is a display-side case, as shown in FIGS. 1 and 2. A movable arm 8 is attached to the fixed case 4 with a hinge 10 that is an opening/closing unit; a rotation module 12 is attached to the movable arm 8 and acts as a rotation supporting unit; and the movable case 6 is fixed to the rotation module 12. In this case, the movable case 6 can be opened and closed by the rotation around the hinge 10, and the movable case 6 can be rotated by a predetermined angle to the right or left from the center position (reference position of rotation) by the rotation around the rotation module 12.

As shown in FIG. 3, a rotation center Oa of the movable case 6 is established in the vicinity of the hinge 10 and a peripheral edge 14 is formed as a half-circle edge on the movable case 6. The fixed case 4 is disposed with an input operation unit 16 including a plurality of keys such as symbol keys and cursor keys, and the movable case 6 is disposed with a displaying unit 18 that is a displaying unit including an LCD (Liquid Crystal Display) device, etc. The displaying unit 18 is a rectangular shape that has vertical and horizontal sides with different lengths, and displays a vertically elongated vertical screen or horizontally elongated horizontal screen depending on a rotation angle θ (between 0 to 90 degrees to the right or left) of the movable case 6.

Since the portable terminal apparatus 2 includes the hinge 10, the movable case 6 can be opened and closed along with the movable arm 8. That is, the movable case 6 can be closed along with the movable arm 8 as shown in FIG. 1 or can be maintained in an opened state as shown in FIG. 3. As shown in FIG. 4, the movable case 6 can be rotated by the rotation module 12 by a predetermined angle, for example, 90 degrees, around the rotation center Oa to the right (an arrow A) or left (an arrow B) to form an L-shape with the fixed case 4. In the opened state shown in FIG. 4, a is a center position (right/left rotation start point) conforming to the center line of the movable case 6; b is aright rotated position (right rotation end point) of the movable case 6; and c is a left rotated position (left rotation end point) of the movable case 6.

In the opened state of the movable case 6, if the movable case 6 is located at the center position a, the displaying unit 18 can display a vertical screen as shown in FIG. 3; if the movable case 6 is located at the right rotated position b, the displaying unit 18 can display a horizontal screen as shown by solid lines of FIG. 4; and if the movable case 6 is located at the left rotated position c, the displaying unit 18 can display a horizontal screen as shown by dotted lines of FIG. 4.

Figure 5:
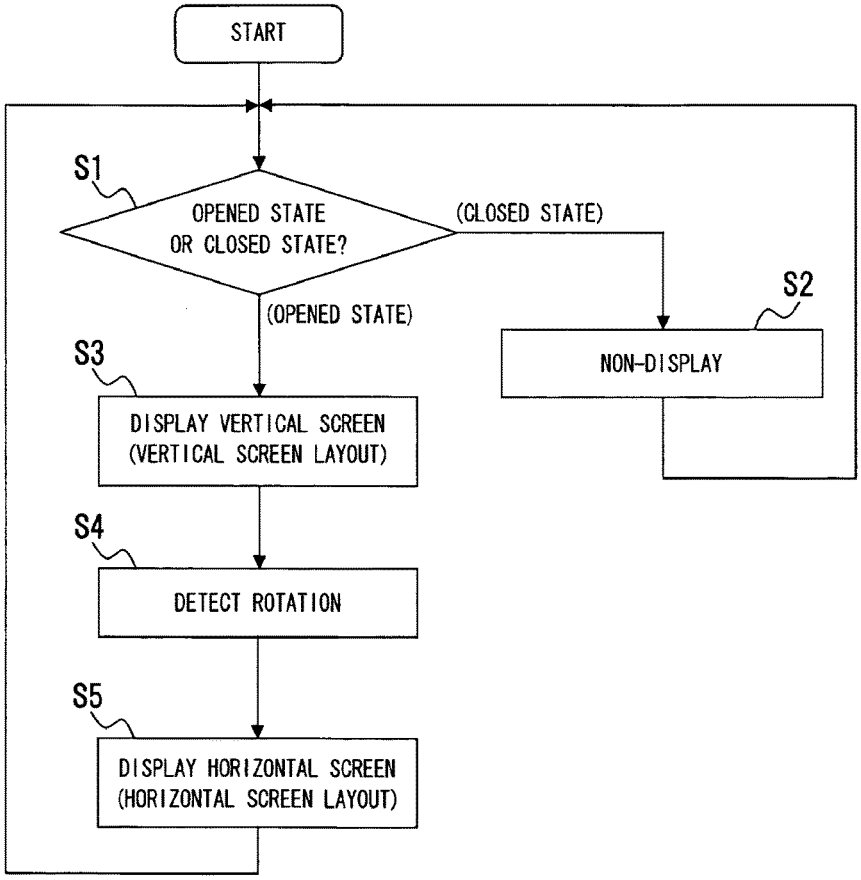
FIG. 5 is a flowchart of an example of a controlling method of the portable terminal apparatus.

A controlling method of the portable terminal apparatus will be described with reference to FIGS. 1 to 4 and FIG. 5. FIG. 5 is a flowchart of process procedures that are an example of a controlling method of the portable terminal apparatus.

In this controlling method, it is detected whether the movable case 6 is in the opened state or closed state (step S1) and, in the case of the closed state, the displaying unit 18 displays nothing since the fixed case 4 overlaps the movable case 6 to hide the displaying unit 18 (step S2).

If the movable case 6 is in the opened state (FIG. 3) and the rotation angle of the movable case 6 is zero degrees, the movable case 6 is located at the center position a and the displaying unit 18 displays the vertical screen (step S3).

If the movable case 6 is in the opened state (FIG. 3) and the movable case 6 is rotated to the right or left, based on the detection of the rotation (step S4), the displaying unit 18 displays the horizontal screen depending on the rotated position (step S5).

The vertical or horizontal screen deployed on the displaying unit 18 is controlled to become a screen layout corresponding to a vertically elongated screen display for the vertical screen or a screen layout corresponding to a horizontally elongated screen display for the horizontal screen. The screen layout as used herein generally refers to setting or changing factors such as alignment, arrangement, and direction of display elements such as characters, graphics, images, and icons displayed on the screen.

Therefore, this controlling method includes the following process procedures for displaying the vertical screen or the horizontal screen and changing the screen layout corresponding to each screen, correspondingly to the opening/closing operation of the fixed case 4 and the movable case 6, the rotating operation of the movable case 6, etc.

a) Detection of Opening/Closing or Rotation of Movable Case 6

The movable case 6 is opened and closed with the movable arm 8 and the hinge 10 relative to the fixed case 4. In either the opened or closed state, the movable case 6 can be rotated on the movable arm 8. To change the display form depending on whether the movable case 6 is in the opened state or the closed state and depending on the rotation angle, a open/close sensor 112 (FIG. 13) of a sensor unit 96 detects the opened state or the closed state and rotation sensors 42, 44 (FIGS. 6 and 13) detect the rotation angle θ of the movable case 6.

b) Screen Switching

If the movable case 6 is in the opened state and located at the center position a, the displaying unit 18 displays the vertical screen. If the movable case 6 is rotated to the right rotated position b, the displaying unit 18 displays the horizontal screen, or if the movable case 6 is rotated to the left rotated position c, the displaying unit 18 is switched to the display aspect of the horizontal screen. If the movable case 6 is returned to the center position a from the horizontal screen display position, the displaying unit 18 is switched to the display of the vertical screen. The display aspect of the screen of the display unit 18 is switched based on the open/close detection and the rotation detection by a control program described later.

c) Screen Layout Changing Control

With regard to the vertical or horizontal screens acquired by the above screen switching, the screen display is switched to a vertical screen layout for the vertical screen and switched to a horizontal screen layout for the horizontal screen. In the case of the horizontal screen, the screen display may be switched to a screen layout corresponding to the right side for a right horizontal screen and switched to a screen layout corresponding to the left side for a left horizontal screen. The screen layouts are set and controlled by the control program described later.

Figure 6:
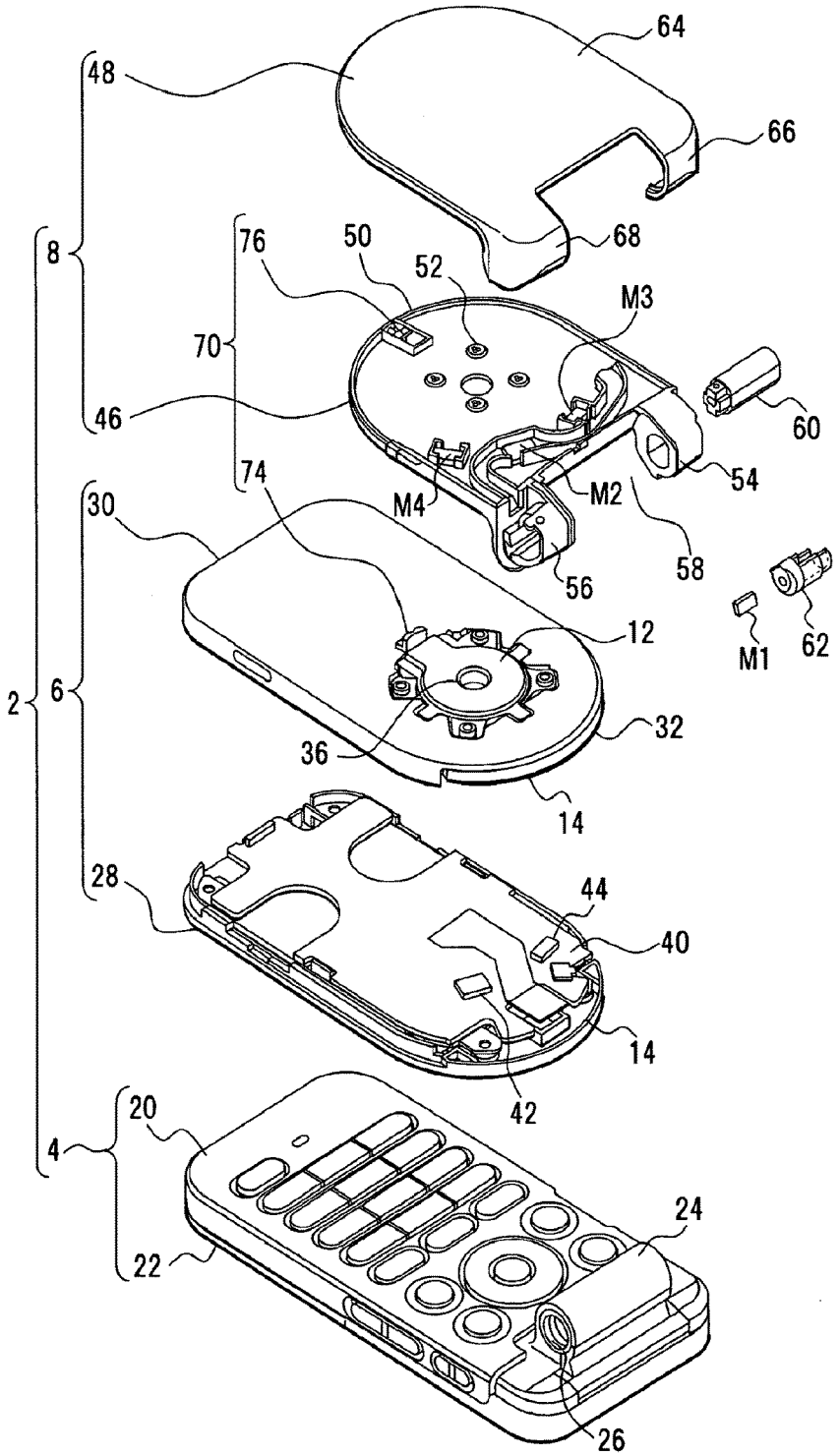
FIG. 6 is an exploded perspective view of the portable terminal apparatus.
Figure 7:
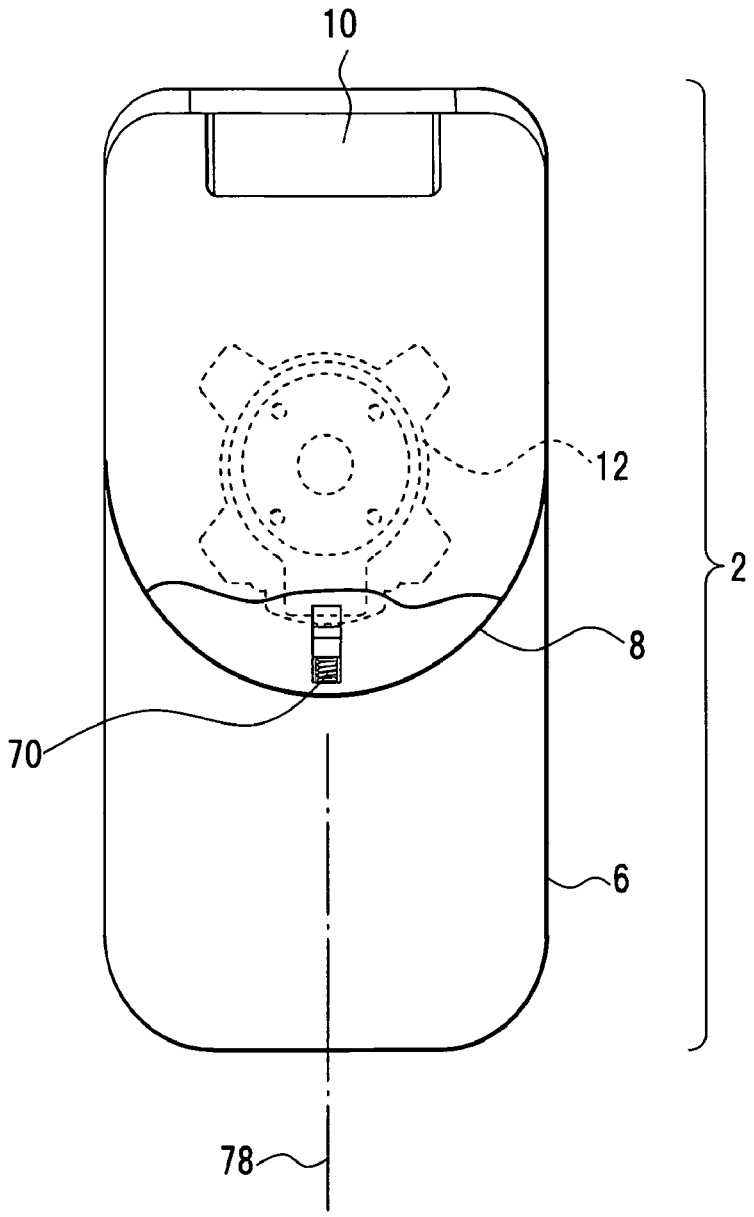
FIG. 7 depicts a position of a rotation lock mechanism of the portable terminal apparatus.
Figure 8:
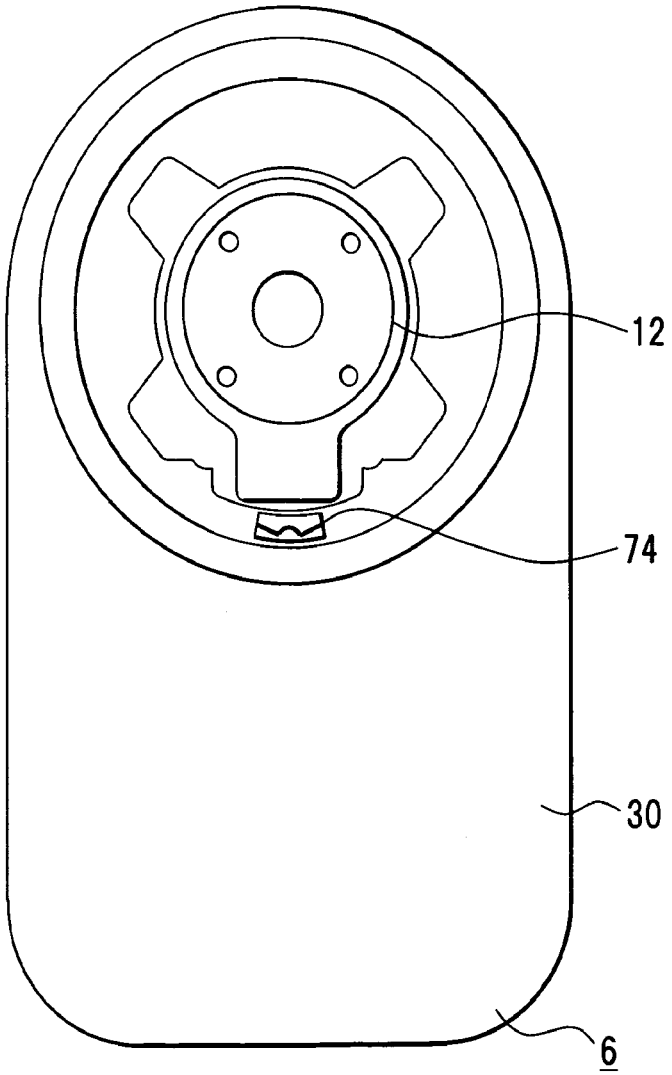
FIG. 8 depicts a top side of a movable rear-case.
Figure 9:
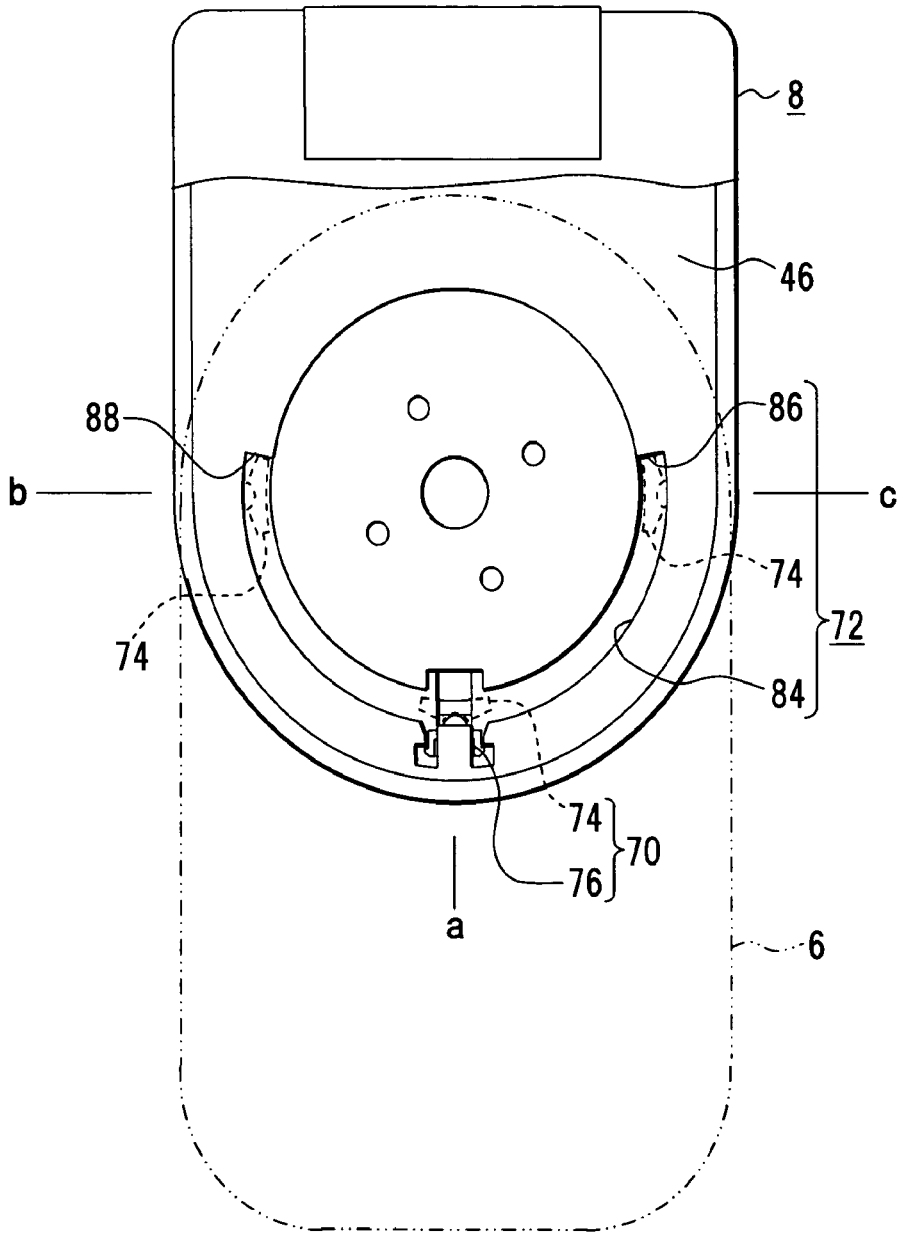
FIG. 9 depicts a rear side of a movable arm.
Figure 10:
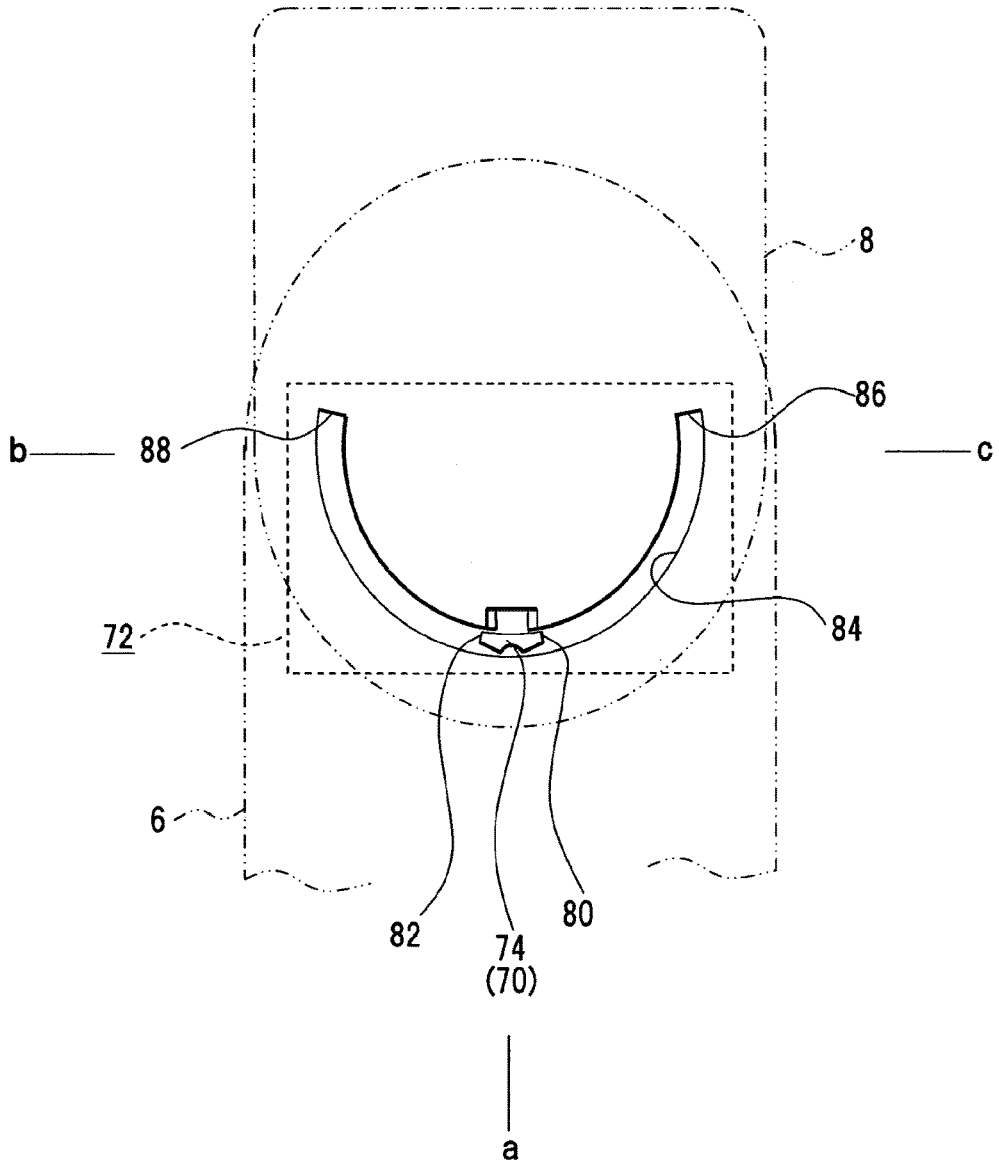
FIG. 10 depicts a stopper mechanism and a center stop position.
Figure 11:
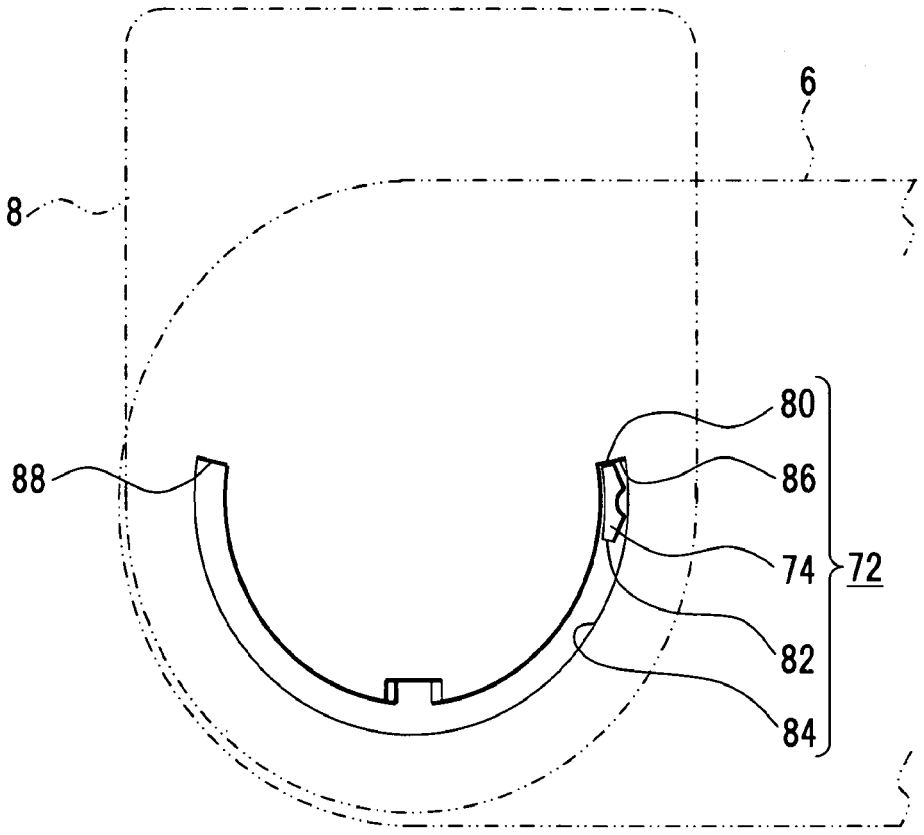
FIG. 11 depicts a stopper operation.
Figure 12:
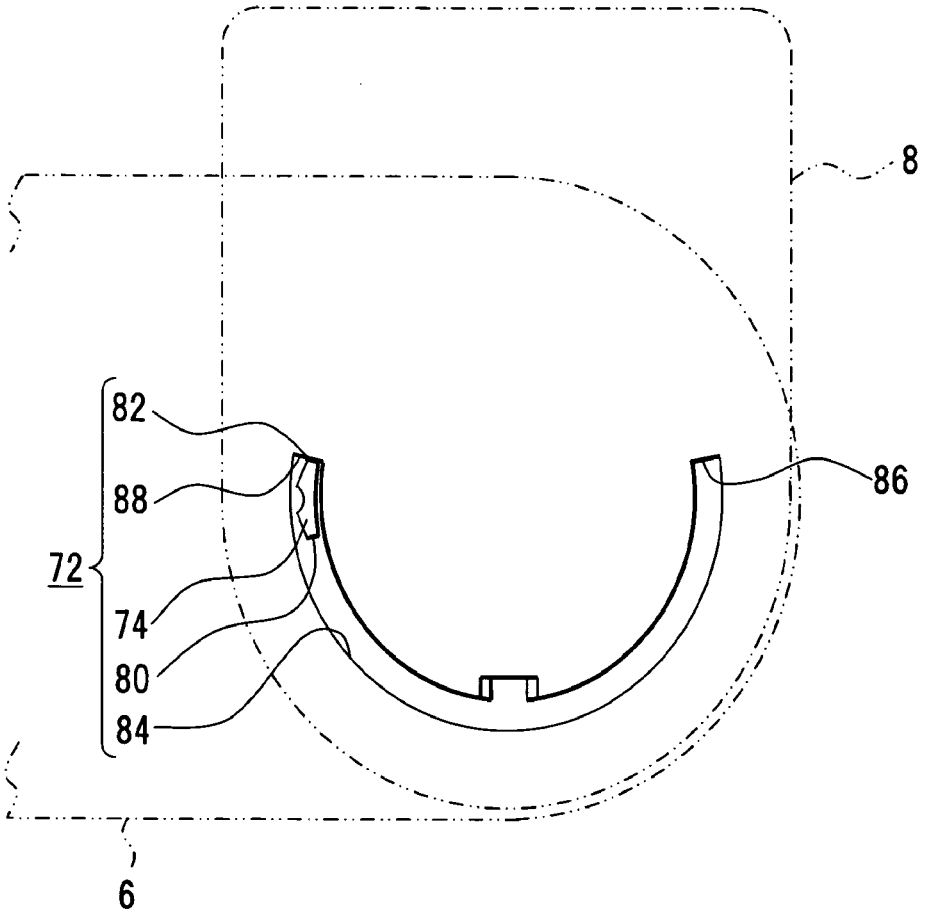
FIG. 12 depicts a stopper operation.

A configuration example of the portable terminal apparatus 2 will be described with reference to FIGS. 6 to 12. FIG. 6 is an exploded perspective view of the portable terminal apparatus; FIG. 7 depicts a position of a rotation lock mechanism of the portable terminal apparatus; FIG. 8 depicts a top side of a movable rear-case; FIG. 9 depicts a rear side of a movable arm; and FIGS. 10, 11, and 12 depict a stopper configuration and operation thereof. In FIGS. 6 to 12, the same reference numerals are added to the same portions as FIGS. 1 to 4.

As shown in FIG. 6, the fixed case 4 includes a fixed front-case 20 and a fixed rear-case 22, and a bearing 24 of the hinge 10 is formed on the longitudinal edge of the fixed front-case 20. The bearing 24 is disposed with a bearing hole 26. A fixed substrate, etc., are mounted to the fixed rear-case 22.

The movable case 6 includes a movable front-case 28 and a movable rear-case 30, and the rotation module 12 is attached to a round portion 32 of the movable rear-case 30. A through-hole 36 is formed at a rotation center portion of the rotation module 12 and the through-hole 36 is used to allow cables not shown to pass through.

The movable front-case 28 is disposed with a movable substrate 40, and the movable substrate 40 is disposed with the rotation sensors 42, 44 that detect the rotation direction and the rotation angle θ of the movable case 6.

The movable arm 8 includes an arm 46 and an arm cover 48. To a round portion 50 of the arm 46, the movable rear-case 30 of the movable case 6 is fixed with a fixing means, for example, a plurality of screws 52, along with the above rotation module 12. Bearings 54, 56 of the hinge 10 is formed on the arm 46, and the bearing 24 of the fixed case 4 is inserted into an interval 58 between the bearings 54, 56. A hinge module 60 is a hinge axis reaching the bearing 24 of the fixed case 4 and is inserted and fixed in the bearing 54, and a hinge module 62 also is a hinge axis and is inserted and fixed in the bearing 56. The hinge module 62 may be configured as a cable guide to allow cables not shown to pass through.

The arm 46 of the movable arm 8 is disposed with a plurality of magnets, i.e., three magnets M2, M3, M4, on the same trajectory as the rotation sensors 42, 44 disposed on the movable front-case 28 of the movable case 6. The center position a, the right rotated position b, or the left rotated position c of the rotating movable case 6 is detected by the rotation sensors 42, 44 and the magnets M2, M3, M4.

The arm cover 48 includes a lid 64 that covers the top surface of the arm 46 and covering portions 66, 68 that cover the bearings 54, 56. The lid 64 is bonded to the arm 46 to protect the top surface of the arm 46, and the covering portions 66, 68 cover peripheral walls of the bearings 54, 56 to reinforce and protect the bearings 54, 56.

The hinge 10 includes the bearing 24 of the fixed case 4, the bearings 54, 56 of the movable arm 8, and the hinge modules 60, 62 as above and supports the movable arm 8 on the fixed case 4 in an openable/closable manner (allowing 180-degree opening/closing in this embodiment). The rotation module 12 rotatably supports the movable case 6 on the movable arm 8.

The movable arm 8 rotatably supporting the movable case 6 via the rotation module 12 and the movable case 6 made rotatable on the movable arm 8 by a rotation module 34 are disposed with a rotation lock mechanism 70 (FIG. 7, etc.) that determines the center position, i.e., zero-degree position, of the allowable left/right rotation angles of 90 degrees of the movable case 6 and a stopper mechanism 72 (FIG. 10, etc.) that determines a rotation range of the allowable left/right rotation angles of 90 degrees.

In this embodiment, as shown in FIG. 6, a pin-engaging portion 74 of the rotation lock mechanism 70 is integrally formed with the movable rear-case 30. As shown in FIG. 8, the pin-engaging portion 74 is located outside of the rotation module 12 and projects from the top surface of the movable rear-case 30. A lock pin 76 engaging with the pin-engaging portion 74 is attached to the arm 46 of the movable arm 8 and is disposed within the arm 46 in this embodiment.

As shown in FIG. 9, the rotation lock mechanism 70 is a mechanism for fixing and retaining the movable case 6 rotatably supported via the rotation module 12 by the movable arm 8 at a position conforming to the fixed case 4, i.e., at the center position a. Fixing and retaining of the movable case 6 on the movable arm 8 generate a retaining state that allows a user to recognize the position as a reference position and to the extent that the movable case 6 is not moved unless the user applies a force in the left or right direction with the intention to rotate the movable case 6 and are not assumed to be a lock state that does not allow the movement thereof. The movable case 6 is retained to the extent that the movable case 6 is not rotated by the load of the normal rotating operation.

In this embodiment, to fix and retain the movable case 6 at a position conforming to the fixed case 4, i.e., at the center position a, the rotation lock mechanism 70 is disposed on a virtual center axis 78 (FIG. 7) penetrating the rotation center Oa of the rotation module 12 fixed to the movable arm 8.

As shown in FIG. 10, the stopper mechanism 72 is a configuration that sets the maximum rotation angle of the right/left rotation of the movable case 6, centering on the rotation lock mechanism 70, to stop the movable case 6 at the maximum rotation angle. In this embodiment, the pin-engaging portion 74 is also used as a stopper portion and the stopper surfaces 80, 82 are formed on the pin-engaging portion 74.

For this pin-engaging portion 74, an arc-shaped groove 84 is formed for inserting the pin-engaging portion 74, and stoppers 86, 88 are formed at the ends of the groove 84, coming into contact with the stopper surfaces 80, 82 of the pin-engaging portion 74. Specifically, the stopper surface 80 is applied to the stopper 86 and the stopper surface 82 is applied to the stopper 88 to block the rotation of the movable case 6. The blocking positions are the positions b, c, which are at 90 degrees to the left/right from the center position a.

In such a configuration, when the movable case 6 located at the position shown in FIG. 10 is rotated counterclockwise, the stopper surface 80 of the pin-engaging portion 74 is applied to the stopper 86, which is the end of the groove 84, and the movable case 6 is stopped at the position of 90 degrees counterclockwise (on the observer's right), as shown in FIG. 11. When the movable case 6 located at the position shown in FIG. 10 is rotated clockwise, the stopper surface 82 of the pin-engaging portion 64 is applied to the stopper 88, which is the end of the groove 84, and the movable case 6 is stopped at the position of 90 degrees clockwise (on the observer's left), as shown in FIG. 12.

Figure 13:
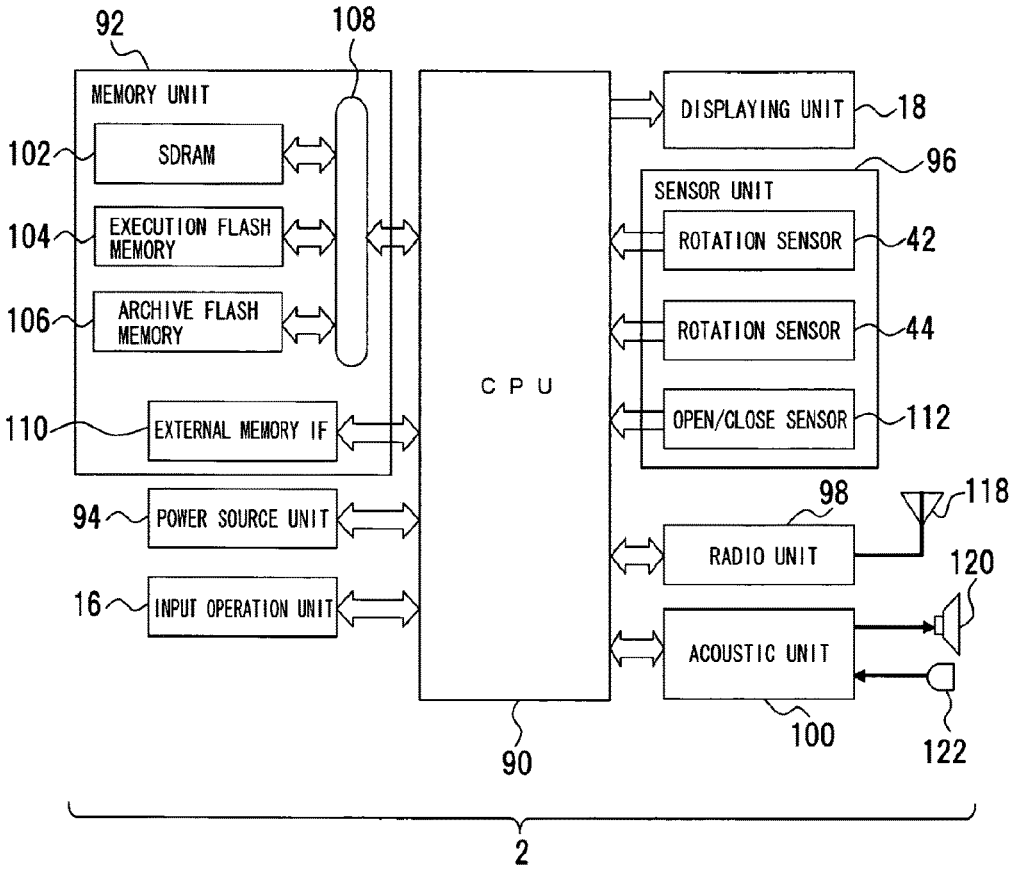
FIG. 13 depicts a circuit configuration example of the portable terminal apparatus.

A circuit configuration of the portable terminal apparatus 2 will be described with reference to FIG. 13. FIG. 13 is a block diagram of an electric circuit of the portable terminal apparatus 2. In FIG. 13, the same reference numerals are added to the same portions as FIGS. 1 to 12.

In addition to a telephone function, an e-mail transmission/reception function, etc., the portable terminal apparatus 2 includes a control function for changing a display form depending on the opening/closing operation of the fixed case 4 and the movable case 6, the rotating operation of the movable case 6, etc.

The portable terminal apparatus 2 includes the input operation unit 16, the displaying unit 18, a CPU (Central Processing Unit) 90, a memory unit 92, a power source unit 94, the sensor unit 96, a radio unit 98, and an acoustic unit 100. The input operation unit 16 includes a plurality of keys and is used to enter telephone numbers and characters for creating e-mail documents, etc. The displaying unit 18 displays the vertical screen or horizontal screen and is switched to different screen aspects and controlled to become a screen layout corresponding to the vertical screen or horizontal screen depending on the opened/closed state and the rotation angle of the movable case 6.

The CPU 90 executes a program in the memory unit 92 to load the detection information and the control information such as loading the input of the input operation unit 16 and the detection signal of the sensor unit 96, to read and write the information of the memory unit 92, and to perform various controls such as the screen control of the displaying unit 18. With regard to the vertical screen and the horizontal screen, the CPU 90 controls the screen layout corresponding to each screen and launches an optimum function for each screen and, in the function corresponding to the vertical screen, the CPU 90 is used for the menu list display, the data list display, the telephone history display, etc., utilizing the spread in the up/down direction of the vertically elongated vertical screen. In the function corresponding to the horizontal screen, the CPU 90 is used for the panoramic display of a camera image, the English text display, the processing thereof, the deployment of television broadcasting reception images, etc., utilizing the spread in the width direction of the horizontally elongated horizontal screen.

The memory unit 92 stores a control program including processes such as execution of functions corresponding to the screen switching, the screen layout switching, and the opening/closing or rotating (screen), other programs, and various data and is a recording medium including an SDRAM (Synchronous Dynamic Random-Access Memory) 102, an execution flash memory 104, and an archive flash memory 106 in this embodiment. The SDRAM 102, the execution flash memory 104, and the archive flash memory 106 are connected to the CPU 90 through a bus 108.

The SDRAM 102 configures a work area, executes the program read and loaded from the archive flash memory 106, and generates calculation processes and control information. The execution flash memory 104 stores various data and constructs a database, etc. The archive flash memory 106 stores various programs such as the OS (Operating System) and control program.

An external memory IF (interface) 110 is connected to an external memory, such as a memory card, and the external memory stores the address data, such as telephone numbers and e-mail addresses, and various contents.

The power source unit 94 includes a battery, a battery charging circuit controlled by the CPU 90, a stabilizing circuit, a power source controlling circuit, etc., and supplies power to various function units such as the radio unit 98.

The sensor unit 96 detects the opening/closing of the movable case 6 due to the movable arm 8, the rotation angle θ (between 0 to 90 degrees to the right or left) and the rotation direction of the movable case 6. Therefore, the sensor unit 96 includes the open/close sensor 112 and the rotation sensors 42, 44. The open/close sensor 112 detects presence of magnetic flux from the magnets M (FIG. 6) to generate detection output that represents whether the movable case 6 is in the opened state or closed state. The rotation sensors 42, 44 are disposed on a movable substrate 40 of the movable case 6, and the disposed positions of the three magnets M2, M3, M4 (FIG. 6) conform to positions on the trajectory of the rotation sensors 42, 44 of the rotating movable case 6.

For example, when located at the center position a (FIG. 3) of the movable case 6, since the rotation sensor 42 overlaps the magnet M2 and the rotation sensor 44 overlaps the magnet M3, the output indicating the center position a of the movable case 6 can be acquired from the rotation sensors 42, 44. At the center position a, for example, the same high-level or low-level output can be acquired from the rotation sensors 42, 44. If the movable case 6 is rotated to the right or left, the magnetic forces from the magnets M2, M3, M4 affecting the rotation sensors 42, 44 are changed, and the rotation sensors 42, 44 generate the output corresponding to the change. The change in the output is generated from the left/right rotation angle θ of 20 degrees and, therefore, represents the rotation direction to the right or left. The output indicating a position of 90 degrees to the right or position of 90 degrees to the left can be acquired from the rotation sensors 42, 44. For example, when the high-level output is acquired from the rotation sensor 42 and the low-level output is acquired from the rotation sensor 44, the output indicates the position of 90 degrees to the right, and when the output is acquired inversely, the output indicates the position of 90 degrees to the left.

The radio unit 98 performs transmission/reception for voice communication or data communication such as e-mail through an antenna 118 and performs the modulation process of voice and data, the demodulation process of voice and data from radio signals, etc.

The acoustic unit 100 outputs received voice through a speaker 120 or captures from a microphone 122 and amplifies voice to be transmitted, etc.

Figure 14A:
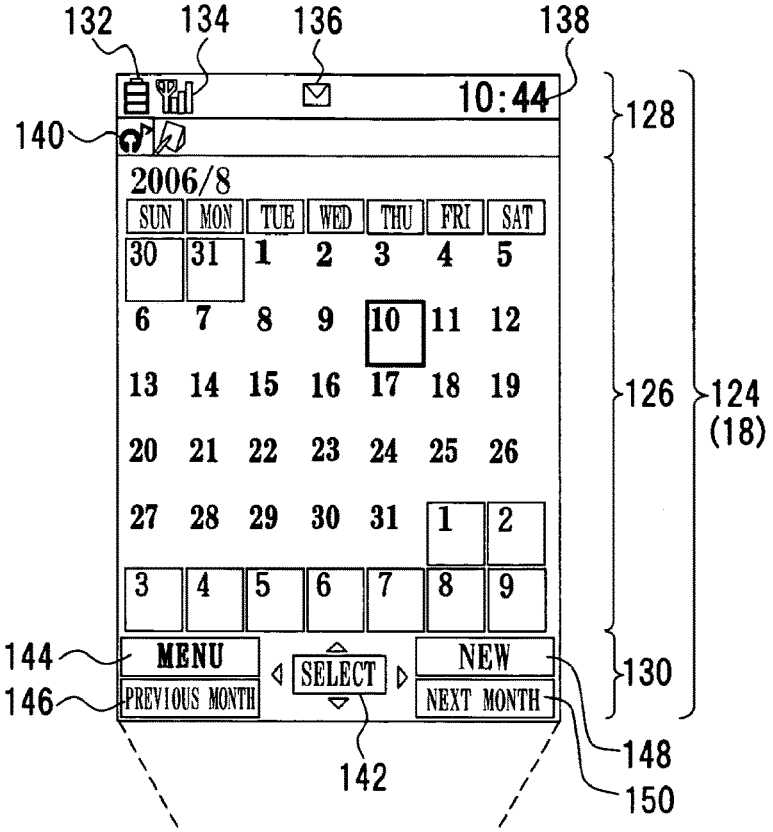
FIGS. 14A and 14B depict a vertical screen display.
Figure 14B:
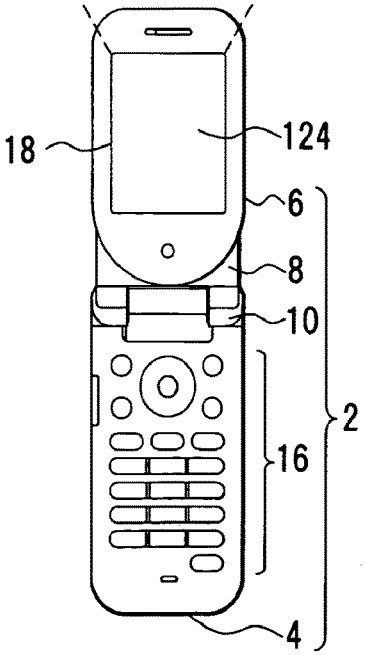

The screen aspect of the displaying unit 18 will be described with reference to FIGS. 14A to 16B. FIGS. 14A and 14B depict a vertical screen display and FIGS. 15A to 16B depict horizontal screen displays. In FIGS. 14A to 16B, the same reference numerals are added to the same portions as FIGS. 1 to 13.

When the movable case 6 is in the opened state, the screen aspect of the displaying unit 18 changes depending on the rotation of the movable case 6, and the vertical screen display (FIGS. 14A and 14B) and the horizontal screen display (FIGS. 15A to 16B) are acquired.

1) Vertical Screen Display

When the movable case 6 is in the opened state and a vertical screen 124 is displayed on the displaying screen 18 as shown in FIG. 14A, the movable case 6 is located at the center position a as shown in FIG. 14B. The vertical screen 124 is a screen when the displaying unit 18 is maintained in a vertically long state; a middle portion is set to a vertical main display field 126; and top and bottom portions are set to first and second vertical sub-display fields 128, 130. For example, in a schedule management mode, the vertical main display field 126 displays a calendar along with the year and month display; the second vertical sub-display field 128 displays a battery mark 132 representing a remaining amount of the battery, a radio-wave reception intensity mark 134 representing radio-wave reception intensity, a mail mark 136 representing whether an e-male is received, a time display 138 representing a clock time in a first line and icons 140 in a second line; and the second vertical sub-display field 130 displays a selection icon 142 corresponding to a schedule management menu at the center, a menu icon 144 and a previous month icon 146 to the left of the selection icon 142, and a new icon 148 and a next month icon 150 to the right of the selection icon 142. The previous month icon 146 is used for displaying a previous month calendar on the vertical main display field 126 and the next month icon 150 is used for displaying a next month calendar on the vertical main display field 126. The selection icon 142 is used for selecting a menu, date and time, etc. The new icon 148 is used for registering a new schedule on the selected date and time.

2) Horizontal Screen Display

Figure 15A:
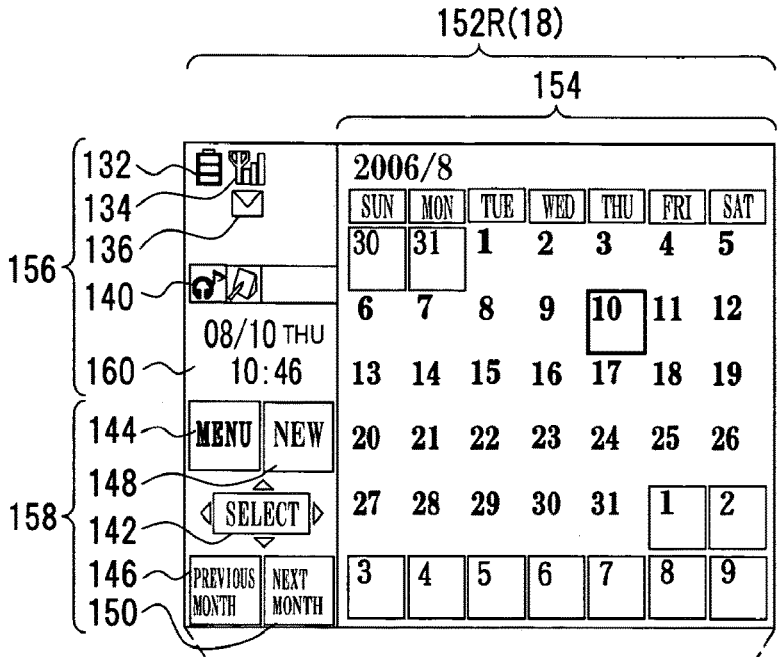
FIGS. 15A and 15B depict a horizontal screen display.
Figure 15B:
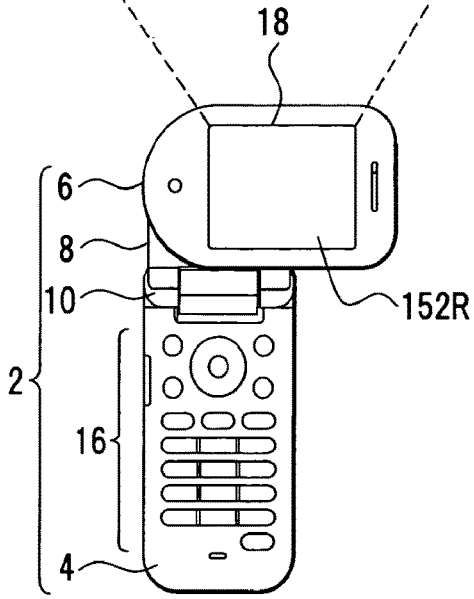

When the movable case 6 is rotated to the right as shown in FIG. 15B, the displaying unit 18 displays a horizontal screen 152R (right horizontal screen) as shown in FIG. 15A. The horizontal screen 152R is a screen when the displaying unit 18 is maintained in a horizontally long state; a horizontal main display field 154 is set to the right side; and horizontal sub-display fields 156, 158 are set to the left side. As is the case with the vertical screen, in the schedule management mode, the horizontal main display field 154 displays a calendar along with the year and month display, and the horizontal sub-display fields 156, 158 display from the top side the battery mark 132, the radio-wave reception intensity mark 134, the mail mark 136, the icons 140, a date/time display 160 representing a date, day of the week, and clock time as well as the selection icon 142 corresponding to a schedule management menu at the center, the menu icon 144 and the new icon 148 on the upper side of the selection icon 142, and the previous month icon 146 and the next month icon 150 on the lower side of the selection icon 142.

Figure 16A:
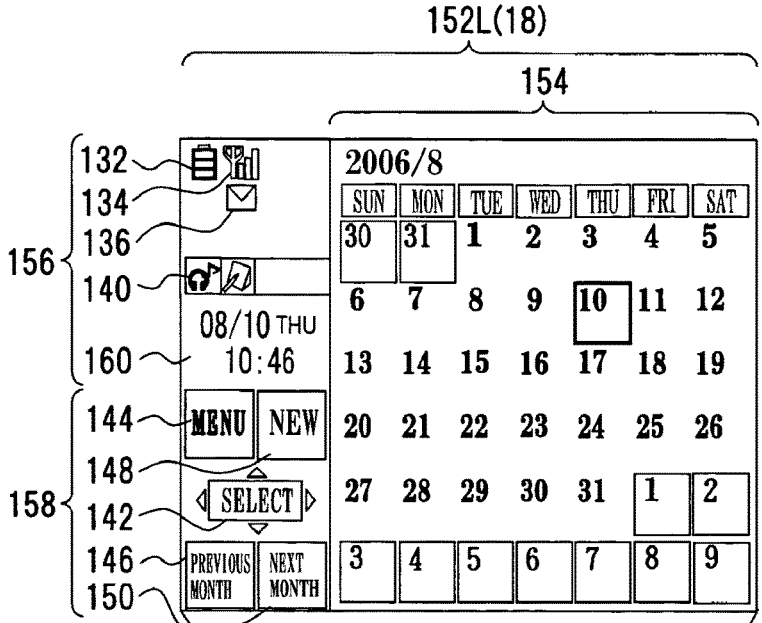
FIGS. 16A and 16B depict a horizontal screen display.
Figure 16B:
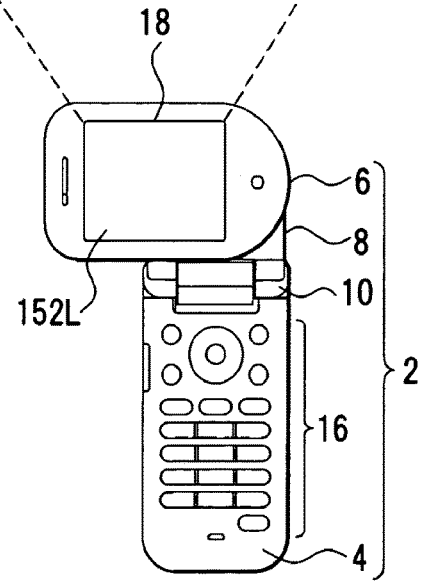

When the movable case 6 is rotated to the left as shown in FIG. 16B, the displaying unit 18 displays a horizontal screen 152L (left horizontal screen) as shown in FIG. 16A. The horizontal screen 152L is a screen when the displaying unit 18 is maintained in a horizontally long state and the display aspect of the horizontal screen 152L is the same as the horizontal screen 152R. Therefore, the same reference numerals are added to the same portions and the description thereof is omitted.

Figure 17A:
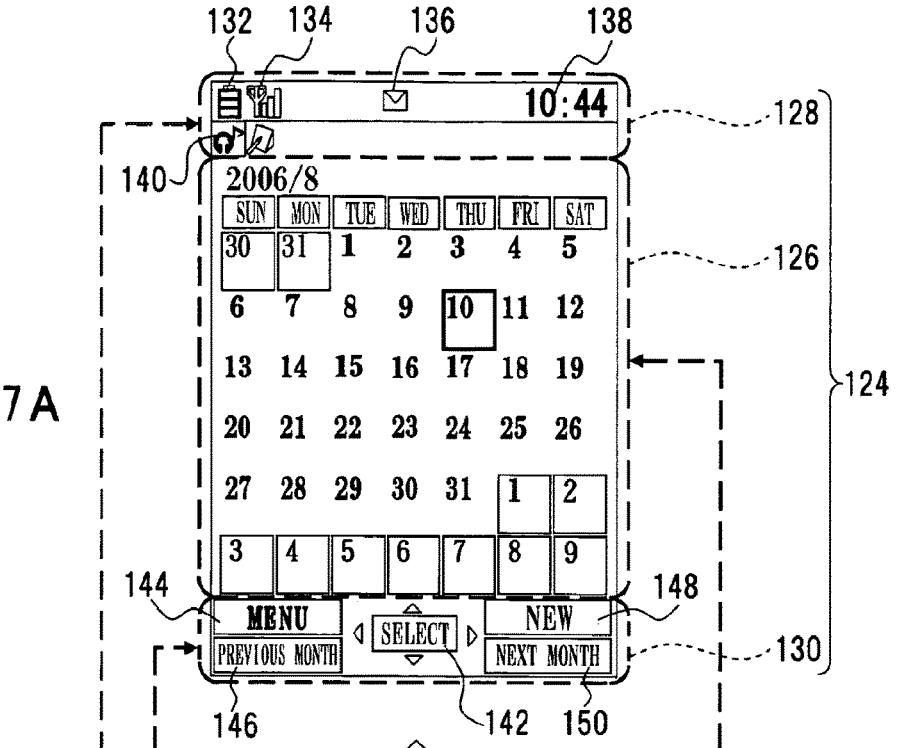
FIGS. 17A and 17B depict a change in a screen layout.
Figure 17B:
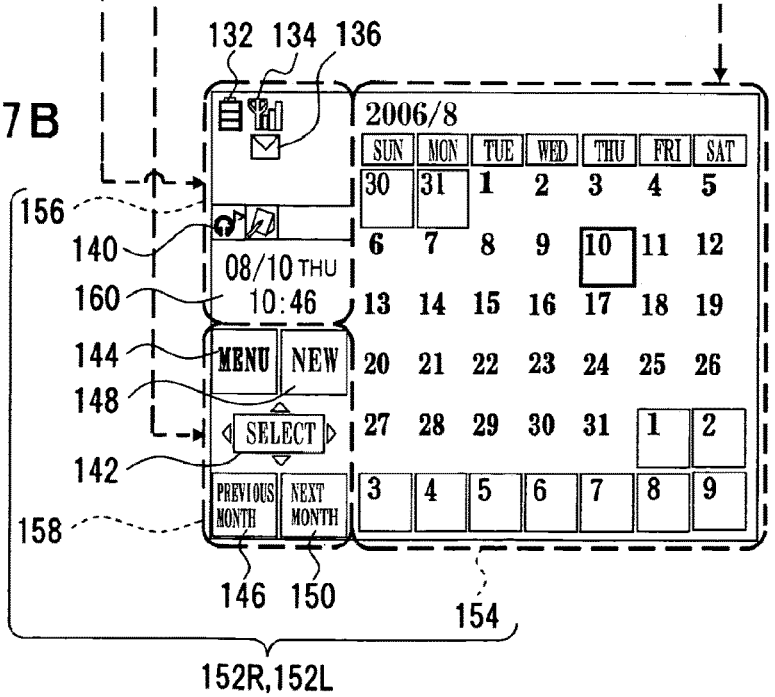

The switching of the screen layout of the vertical screen 124 and the horizontal screens 152R, 152L will be described with reference to FIGS. 17A and 17B. FIGS. 17A and 17B depict differences and relationships of screen layouts of the vertical screen 124 and the horizontal screens 152R, 152L.

The changes in the screen layouts of the vertical screen 124 and the horizontal screens 152R, 152L are listed as follows.

With regard to the vertical main display field 126 and the horizontal main display field 154, as shown in FIG. 17, the vertical main display field 126 of the vertical screen 124 and the horizontal main display field 154 of the horizontal screens 152R, 152L have a square shape in common, and the disposed positions are changed. That is, on the vertical screen 124, the vertical main display field 126 is located in the center of the vertical screen 124 and, on the horizontal screens 152R, 152L, the horizontal main display field 154 is located on the right sides of the horizontal screens 152R, 152L.

With regard to the vertical sub-display fields 128, 130 and the horizontal sub-display fields 156, 158, on the vertical screen 124, while the vertical main display field 126 is disposed in the center with the vertical sub-display field 128 located in the upper field of the vertical main display field 126 and the vertical sub-display field 130 in the lower field of the vertical main display field 126 and, on the horizontal screens 152R, 152L, the horizontal main display field 154 is disposed on the right side with the horizontal sub-display fields 156, 158 located on the upper and lower left sides.

With regard to the vertical sub-display field 128 and the horizontal sub-display field 156, in the vertical sub-display fields 128, the battery mark 132, the radio-wave reception intensity mark 134, the mail mark 136, and the time display 138 are horizontally arranged with the icons 140 located under the battery mark 132, and in the horizontal sub-display field 156, the battery mark 132 and the radio-wave reception intensity mark 134 are arranged with the mail mark 136 located on the underside thereof, the icons 140 located on the underside thereof, and the date/time display 160 located on the underside thereof.

With regard to the vertical sub-display field 130 and the horizontal sub-display field 158, in the vertical sub-display field 130, the selection icon 142 is disposed at the center with the menu icon 144 and the previous month icon 146 located to the left thereof and the new icon 148 and the next month icon 150 located to the right of the selection icon 142 and, in the horizontal sub-display field 158, the selection icon 142 is disposed at the center with the menu icon 144 and the new icon 148 located on the upper side thereof and the previous month icon 146 and the next month icon 150 located on the lower side of the selection icon 142.

With regard to the time display 138 and the date/time display 160, the time display 138 of the vertical screen 124 is hour and minute, and the date/time display 160 of the horizontal screens 152R, 152L is month, date, day of the week, hour, and minute, which are more detailed than the vertical screen 124.

Figure 18:
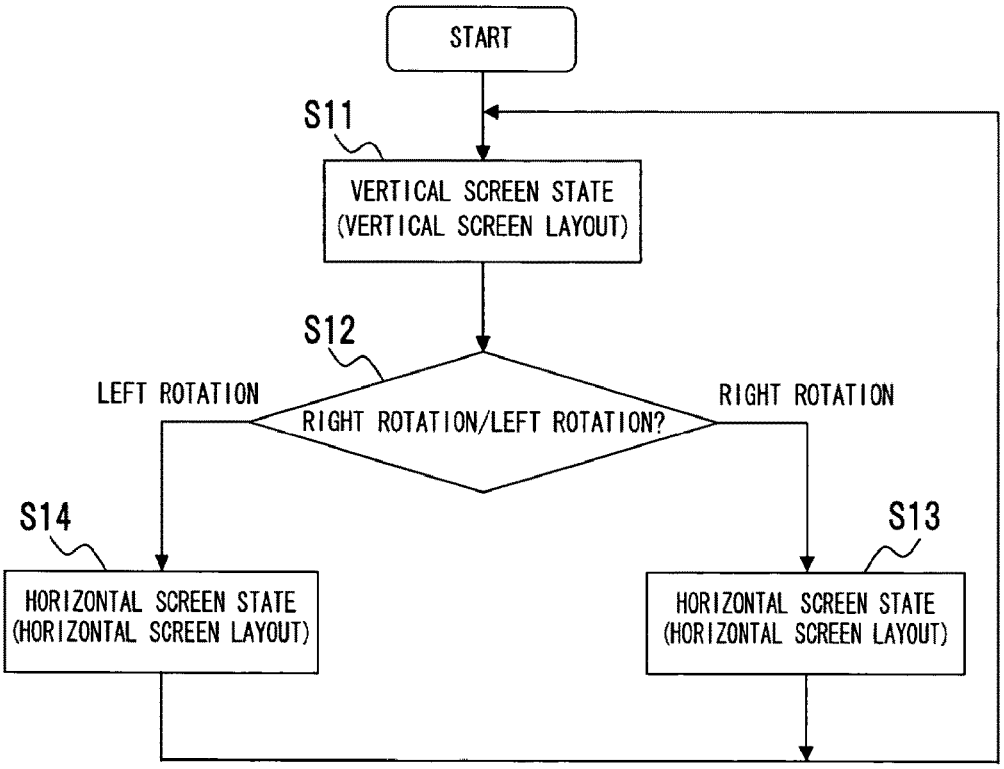
FIG. 18 is a flowchart of an example of a control program of the portable terminal apparatus.

The screen operation of the displaying unit 18 will be described with reference to FIG. 18. FIG. 18 depicts an example of process procedures of the control program of the displaying unit 18.

When the movable case 6 is opened from the closed state shown in FIG. 1, the movable case 6 becomes the opened state relative to the fixed case 4, as shown in FIG. 3. The displaying unit 18 in the opened state is in the vertical screen state (step S11) and displays, for example, the vertical screen 124 (FIG. 14A), and the vertical screen display has the vertical screen layout.

The rotation of the movable case 6 is monitored; the detection information is loaded from the rotation sensors 42, 44 to the CPU 90; and it is determined from the detection information whether the displaying unit 18 is rotated to the right or left (step S12). As shown by solid lines in FIG. 4, if the movable case 6 is rotated to the right, the displaying unit 18 is in the horizontal screen state after the rotation to the right (step S13) and displays, for example, the horizontal screen 152R (FIG. 15A), and the horizontal screen display has the horizontal screen layout.

As shown by dotted lines in FIG. 4, if the movable case 6 is rotated to the left, the displaying unit 18 is in the horizontal screen state after the rotation to the left (step S14) and displays, for example, the horizontal screen 152L (FIG. 16A), and the horizontal screen display has the horizontal screen layout.

When the movable case 6 is rotated from the horizontal screen states (steps S13 and S14) and is returned to the center position a (FIG. 3), the movable case 6 goes to the vertical screen state again (step S11) and displays the vertical screen 124 (FIG. 14A), and the vertical screen display has the vertical screen layout.

In this way, the vertical screen 124 is switched to the horizontal screen 152R or the horizontal screen 152L; the horizontal screen 152R or the horizontal screen 152L is switched to the vertical screen 124; and the screen aspect is changed to the screen layout corresponding to each screen.

Figure 19A:
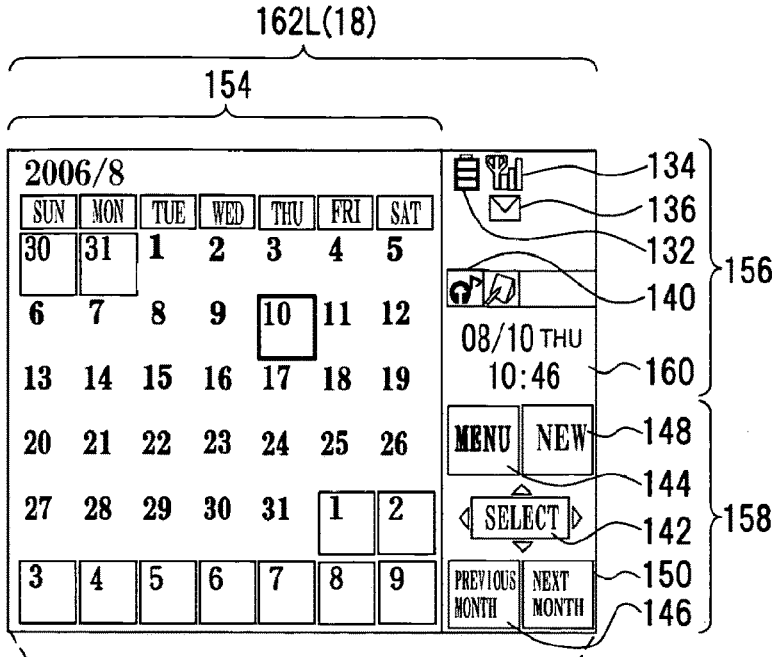
FIGS. 19A and 19B depict another horizontal screen display.
Figure 19B:
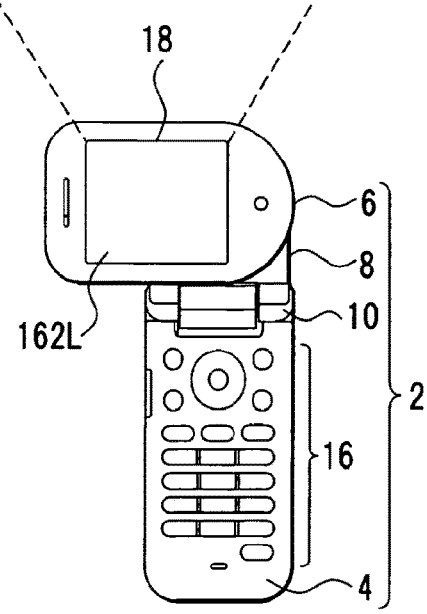

With regard to the horizontal screen display of the first embodiment, although the horizontal sub-display fields 156, 158 are located to the left of the horizontal main display field 154 on the horizontal screen 152L as shown in FIG. 16A, the horizontal main display field 154 may be located on the left side and the horizontal sub-display fields 156, 158 may be located to the right of the horizontal main display field 154 to generate a horizontal screen 162L as shown in FIG. 19A. In this case, since the operating area is closer to the input operation unit 16 of the fixed case 4, the input operationality is enhanced.

With regard to the above first embodiment, features will be extracted to refer to operational effects.

The portable terminal apparatus 2 includes a configuration allowing a screen portion, i.e., the displaying unit 18 to be rotated, includes the folding function, and includes a configuration allowing the movable case 6 equipped with the displaying unit 18 to be rotated from the normal vertical screen state by 90 degrees to the left or right.

The rotation and opening/closing of the movable case 6 equipped with the displaying unit 18 are detected by the sensor unit 96, and a function is included to detect whether the displaying unit 18 is rotated to the right or left.

Since the portable terminal apparatus 2 includes a configuration that is rotated from the normal vertical screen state by 90 degrees to the left or right to generated a horizontal screen, when the vertical screen 124 in the opened state is rotated 90-degree to the left or right, not only the character display is rotated 90-degree, but also the screen layout such as arrangement of icons and characters is changed to acquire an easy-to-use screen layout for the horizontal screen display. The horizontal screens 152R, 152L are changed to the vertical screen 124 and an easy-to-use screen layout is acquired for the vertical screen display.

Second Embodiment

Figure 20:
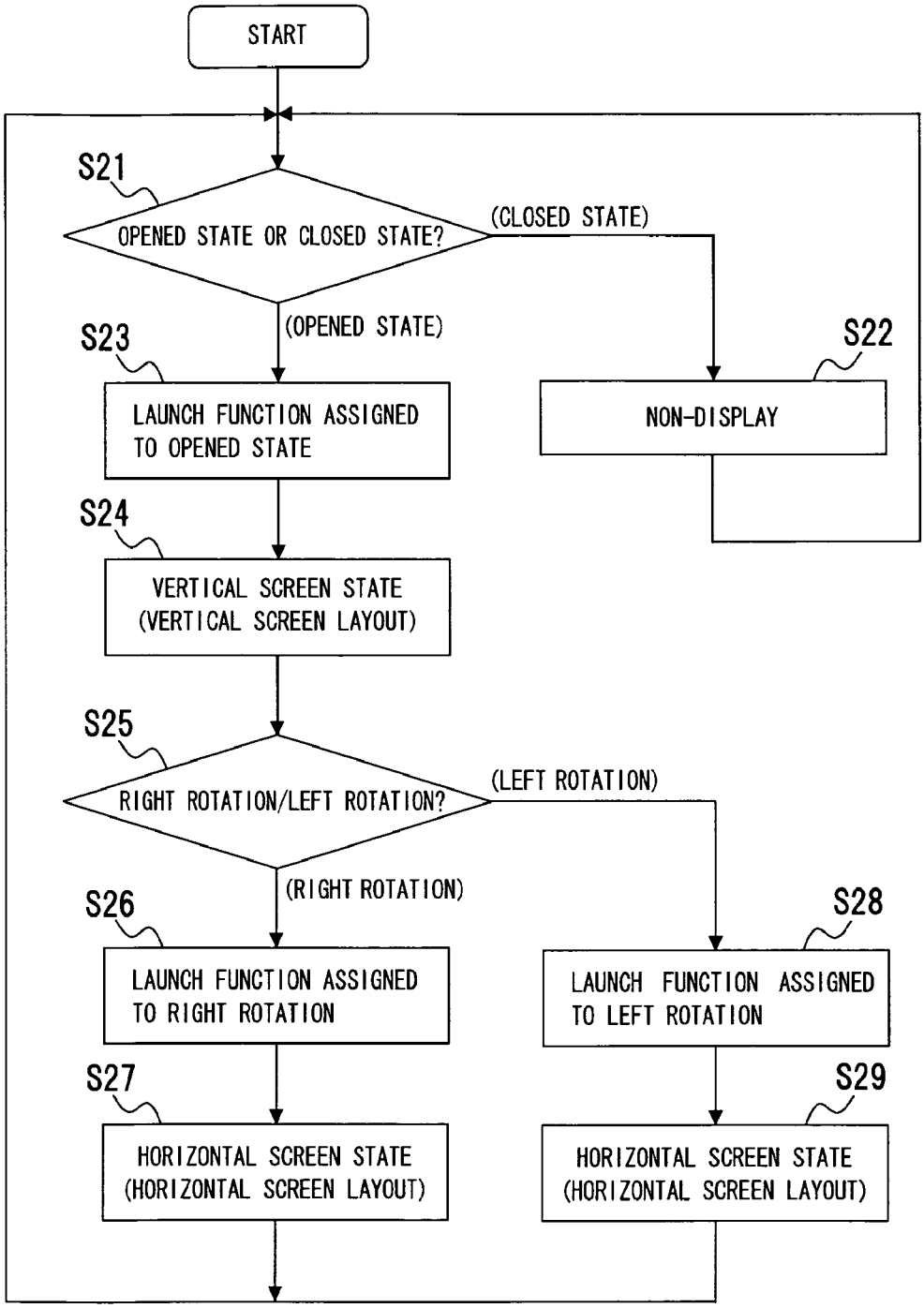
FIG. 20 is a flowchart of a controlling method of a portable terminal apparatus according to a second embodiment.

A second embodiment of the present invention will be described with reference to FIG. 20. FIG. 20 is a flowchart of a controlling method of the portable terminal apparatus according to the second embodiment.

The portable terminal apparatus 2 according to the second embodiment includes a function of switching the screen display based on detection of the rotation and the rotation direction of the movable case 6 equipped with the displaying unit 18 and, when the vertical screen 124 (FIG. 14A) is rotated to the horizontal screen 152R (FIG. 15A) or the horizontal screen 152L (FIG. 16A) and when the horizontal screen 152R (FIG. 15A) or the horizontal screen 152L (FIG. 16A) is rotated to the vertical screen 124 (FIG. 14A), a convenient function is launched for each screen. Therefore, the portable terminal apparatus 2 according to the second embodiment includes the same configuration as the portable terminal apparatus 2 according to the first embodiment (FIGS. 1 to 4, 6, and 13).

In the controlling method of the portable terminal apparatus 2, as shown in FIG. 20, it is detected whether the movable case 6 is in the opened state or closed state (step S21) and, in the case of the closed state, the displaying unit 18 displays nothing since the fixed case 4 overlaps the movable case 6 to hide the displaying unit 18 (step S22).

When the movable case 6 is operated and goes to the opened state (FIG. 3), a function assigned to the opened state is launched (step S23), and this launch results in the vertical screen state (step S24). In this case, if the rotation angle of the movable case 6 is zero degrees, the movable case 6 is located at the center position a and, for example, the vertical screen 124 is displayed as a vertically elongated vertical screen.

When the movable case 6 is in the opened state (FIG. 3), if the movable case 6 is rotated to the right or rotated to the left, the rotation and the rotation direction, i.e., right rotation or left rotation are detected (step S25).

In the case of the right rotation, the function assigned to the right rotation is launched (step S26) to form the horizontal screen state after the rotation to the right (step S27) and, for example, the horizontal screen 152R is displayed as a horizontally elongated horizontal screen. In the case of the left rotation, the function assigned to the left rotation is launched (step S28) to form the horizontal screen state after the rotation to the left (step S29) and, for example, the horizontal screen 152L is displayed as a horizontally elongated horizontal screen.

This controlling method includes the above procedures such as a) detection of opening/closing or rotation of movable case 6, b) screen switching, and c) screen layout changing control, and the processes are performed to launch the functions assigned to the opened/closed states or the right and left rotations, etc. with the control program depending on the opening/closing and the rotation direction. With the control program, the CPU 90 loads the detection information of the open/close detection and the rotation detection of the sensor unit 96, and the vertical or horizontal screen deployed on the displaying unit 18 is controlled to become the screen layout corresponding to the vertically elongated screen display for the vertical screen or the screen layout corresponding to the horizontally elongated screen display for the horizontal screen.

The function corresponding to the vertical screen is used for the menu list display, the data list display, and the telephone history display, utilizing the spread in the up/down direction of the vertically elongated vertical screen, and the function corresponding to the horizontal screen is used for the panoramic display of a camera image, the English text display, the processing thereof, and the deployment of television broadcasting reception images, etc., utilizing the spread in the width direction of the horizontally elongated horizontal screen.

In the second embodiment, in response to the detection of the rotation and the direction of the screen portion, the function of switching the screen display is launched along with the associated function that is the convenient function for the horizontal screen when the vertical screen is switched to the horizontal screen to reinforce the functionality of the portable terminal apparatus 2.

Third Embodiment

Figure 21:
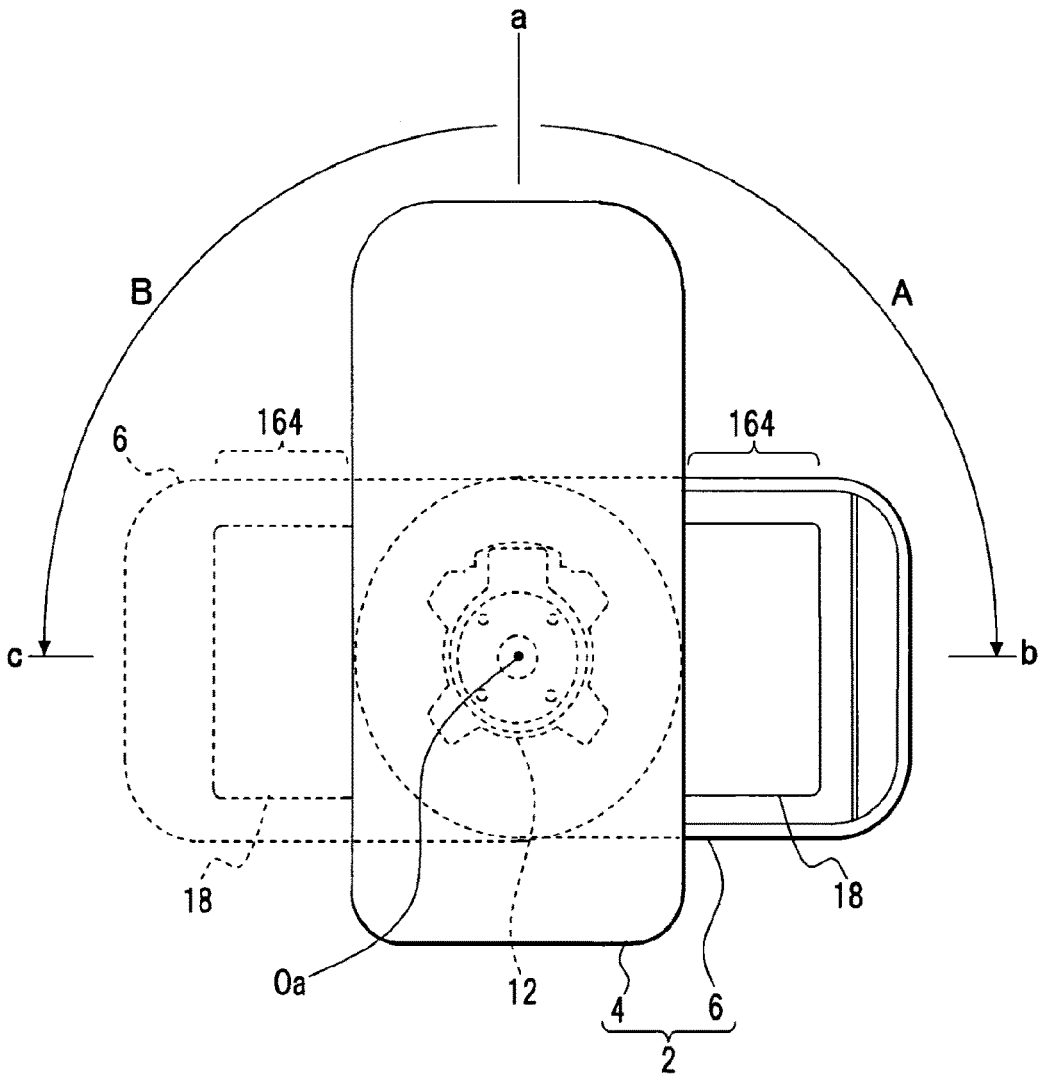
FIG. 21 depicts operation of a portable terminal apparatus according to a third embodiment.
Figure 22:
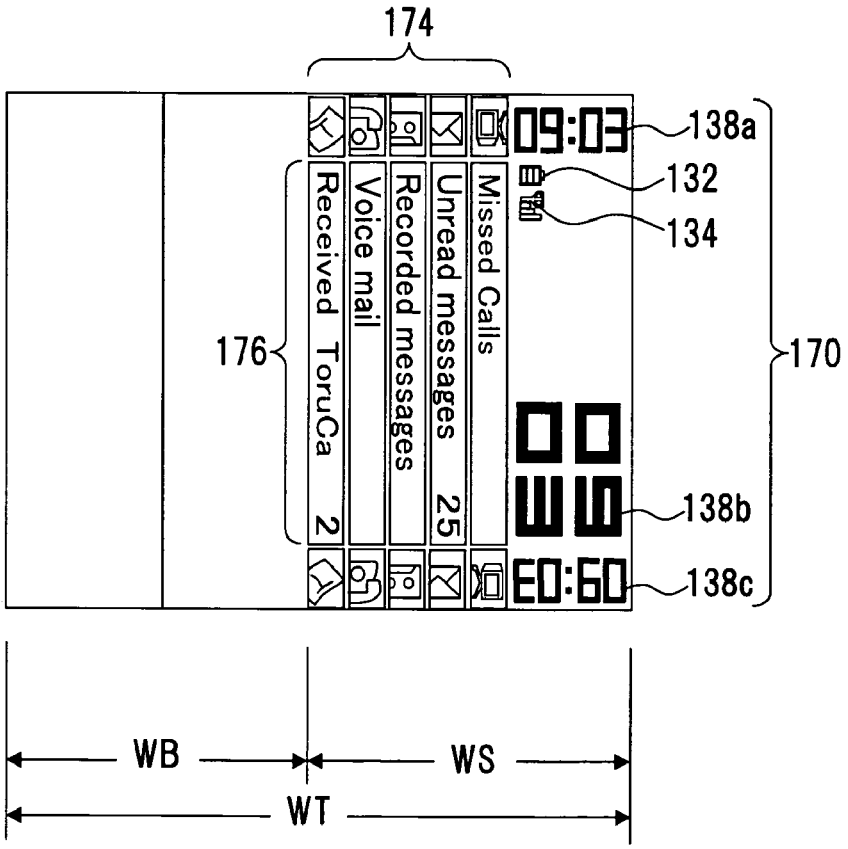
FIG. 22 depicts a right sub-screen display example.
Figure 23:
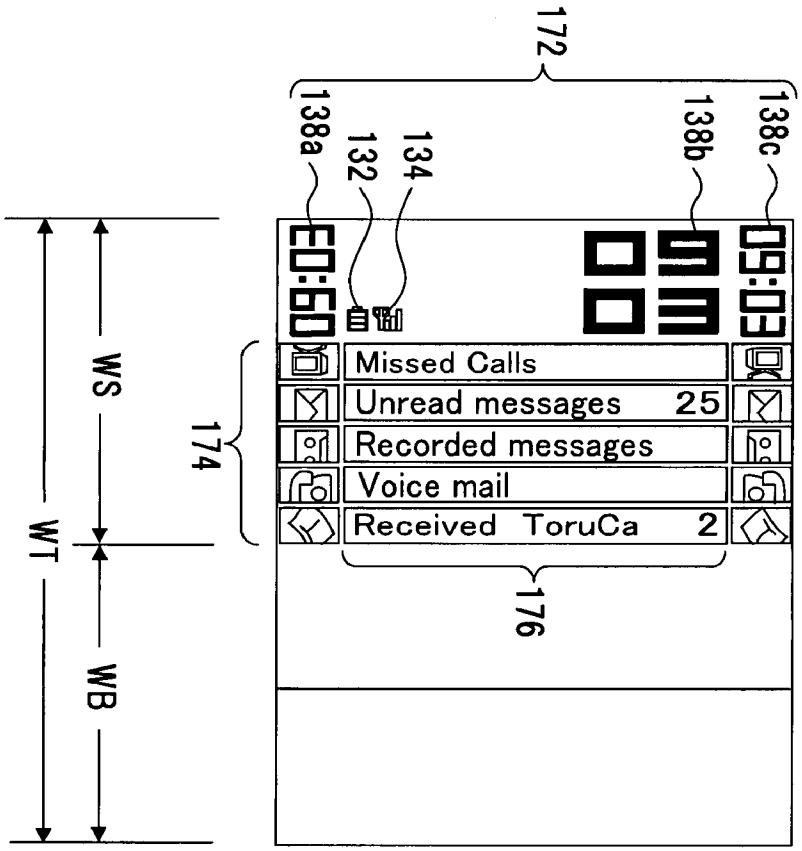
FIG. 23 depicts a left sub-screen display example.
Figure 24:
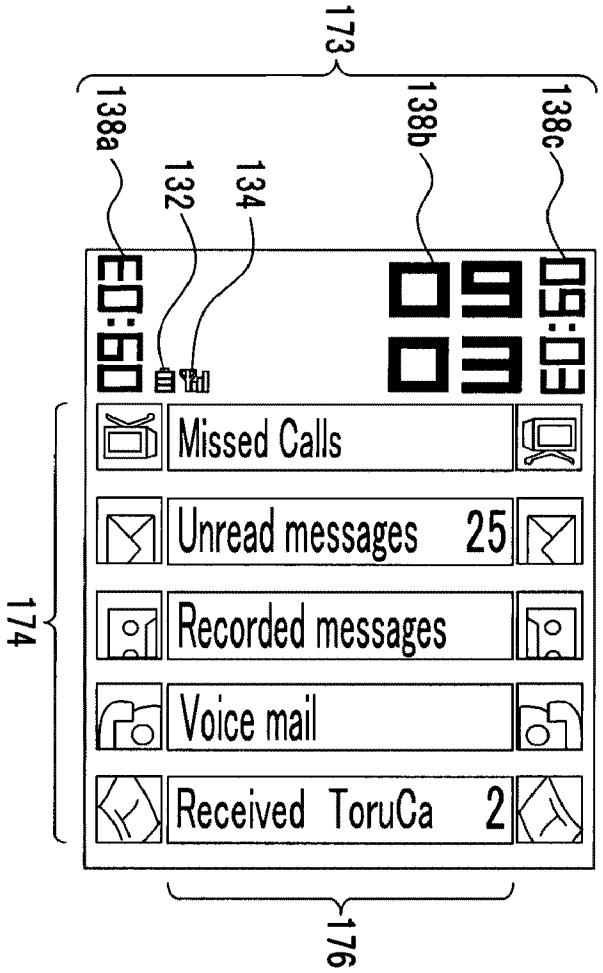
FIG. 24 depicts a horizontal main screen display example.
Figure 25:
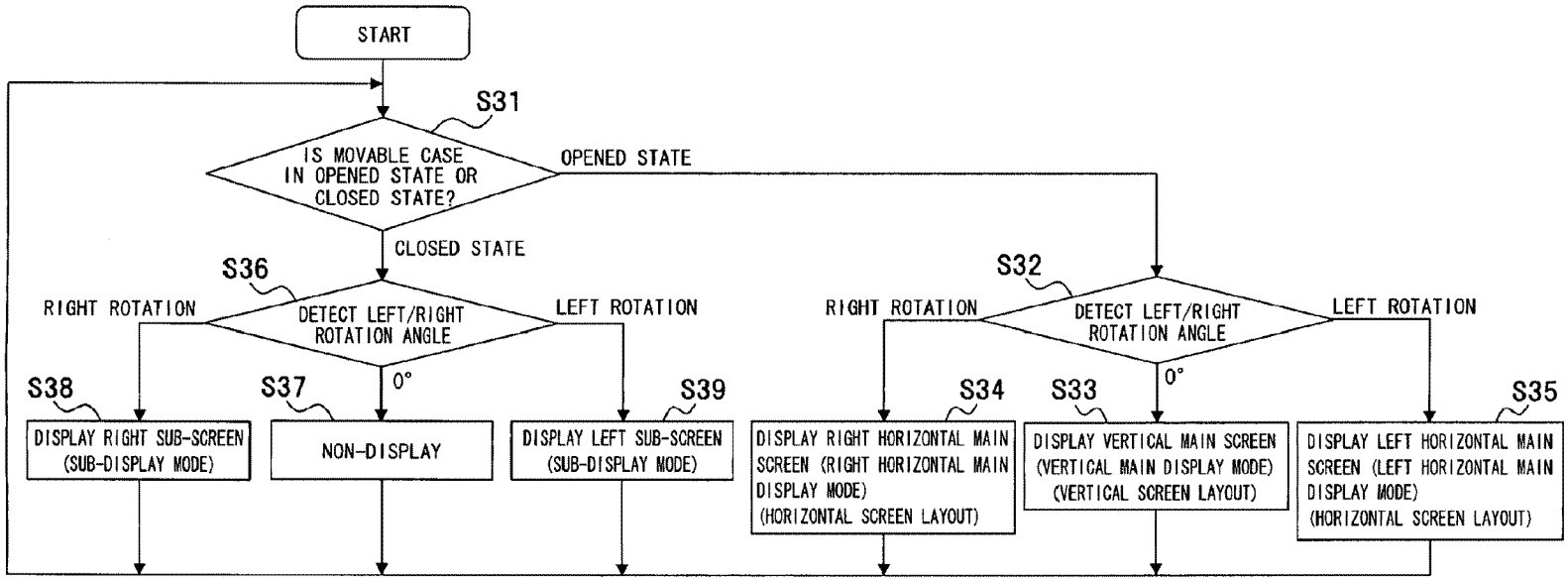
FIG. 25 is a flowchart of a controlling method of the portable terminal apparatus.
Figure 26:
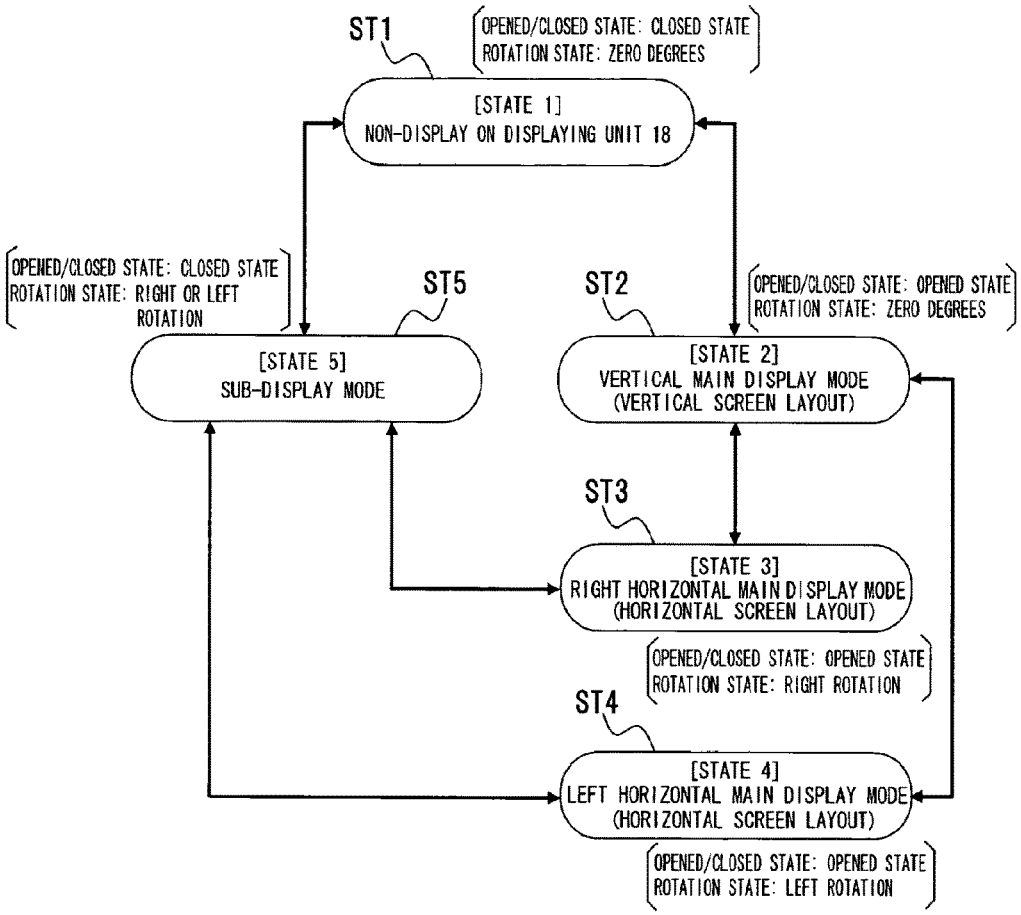
FIG. 26 is a state transition diagram of display screen mode transition.
Figure 27:
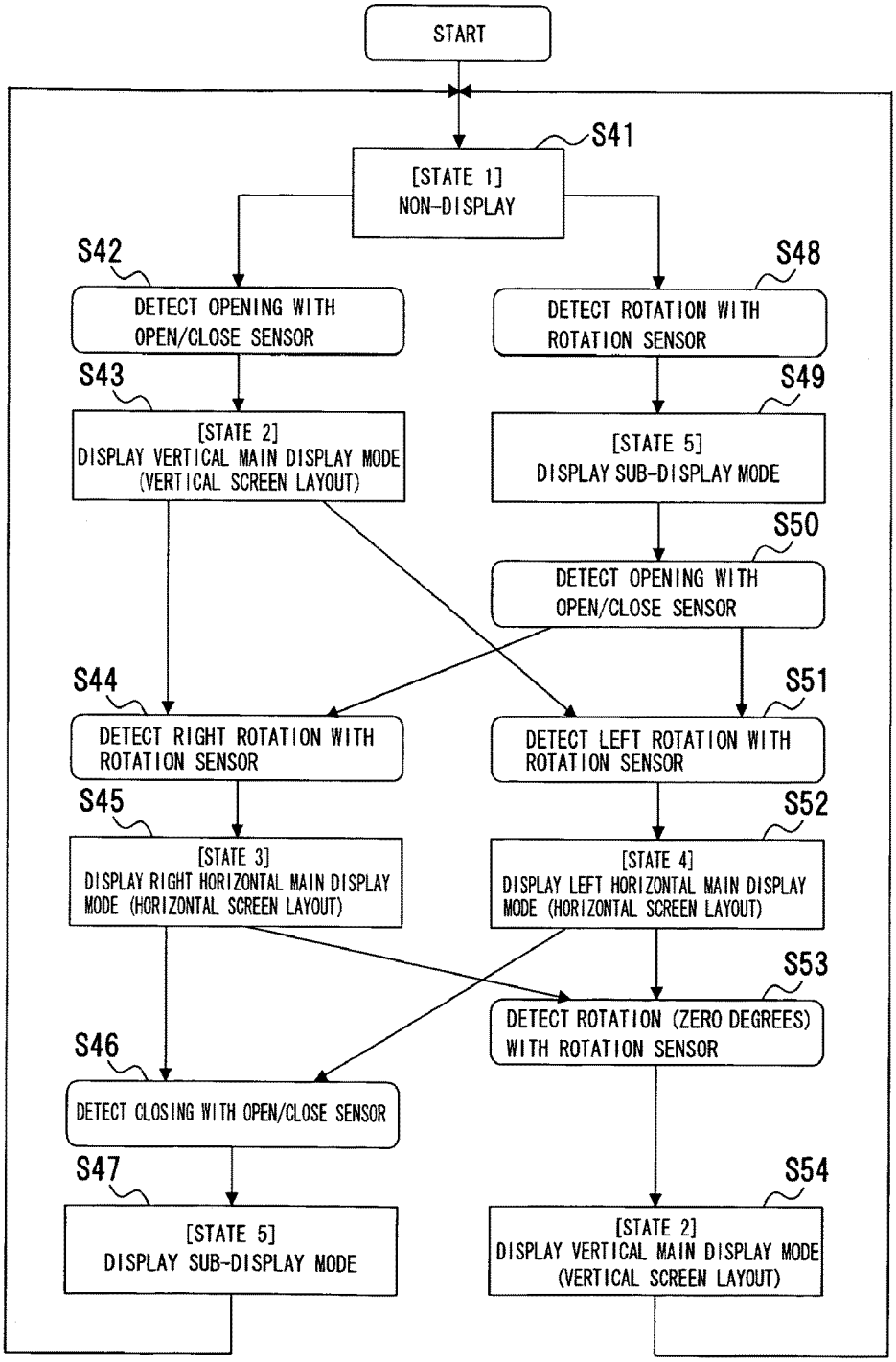
FIG. 27 is a flowchart of operation procedures of the portable terminal apparatus.

A third embodiment of the present invention will be described with reference to FIGS. 21 to 27. FIG. 21 depicts left/right rotation of the movable case of the portable terminal apparatus in the closed state; FIG. 22 depicts a right sub-screen display example; FIG. 23 depicts a left sub-screen display example; FIG. 24 depicts a horizontal main screen display example; FIG. 25 is a flowchart of a controlling method of the portable terminal apparatus; FIG. 26 is a state transition diagram of display screen mode transition; and FIG. 27 is a flowchart of operation procedures of the portable terminal apparatus. In FIGS. 21 to 27, the same reference numerals are added to the same portions as FIGS. 1 to 20.

This embodiment includes the same configuration as the first embodiment. In this case, as shown in FIG. 21, in the portable terminal apparatus 2, the movable case 6 can be rotated around the rotation center Oa of the rotation module 12 to the right (an arrow A) or left (an arrow B) while the movable case 6 is folded onto the fixed case 4, i.e., in the closed state, and a partial display area 164 of the displaying unit 18 of the movable case 6 can be viewed from backside of the fixed case 4 at the right rotated position b, as shown by solid lines.

Although the display of the displaying unit 18 is cancelled when the movable case 6 is in the closed state, if the movable case 6 is rotated to the right from the center position a, which is the reference position, a right sub-screen 170 can be displayed as shown in FIG. 22, for example. If the movable case 6 is rotated to the left from the center position a, a left sub-screen 172 can be displayed as shown in FIG. 23, for example. Although the right sub-screen 170 and the left sub-screen 172 are the same screen display in this embodiment, these screens may be symmetrically displayed.

On the right sub-screen 170 and the left sub-screen 172, a display area WS is deployed as an area that can be viewed because the area protrudes from the fixed case 4. On the right sub-screen 170 and the left sub-screen 172, an invisible area overlapping the fixed case 4 is defined as a hidden area WB and a visible area protruding from the fixed case 4 is utilized as the display are WS within an entire display area WT of the displaying unit 18. Although the display contents of the right sub-screen 170 and the left sub-screen 172 may be a portion of the display contents of the main display screen, to prevent lack of information, the display area WS displays the display contents identical or similar to the display contents of the main display screen as the right sub-screen 170 and the left sub-screen 172.

While the displaying unit 18 displays the right sub-screen 170 or the left sub-screen 172, if the movable case 6 is opened, the display contents of the right sub-screen 170 or the left sub-screen 172 may be displayed on a horizontal main screen 173 using the entire display area WT, as shown in FIG. 24, for example. The display examples of the sub-screens 170, 172 and the horizontal main screen 173 are illustrative only, and a main screen with changed display contents or other display screens may be displayed.

The right sub-screen 170, the left sub-screen 172, and the horizontal main screen 173 are illustrative only and display a plurality of messages 176 along with the battery mark 132, the radio-wave reception intensity mark 134, a plurality of time displays 138a, 138b, and 138c, and one or more icons 174 representing notification information such as incoming-call information, presence of unread e-mails, and the number thereof. With regard to the time displays 138a, 138b, and 138c, false recognition such as contents recognition changed due to viewing angles is prevented by switching the screen layouts, such as changing the display angle of the same contents, to facilitate visibility and comprehension of the display contents.

A controlling method of this embodiment includes process procedures of displaying the right sub-screen 170 and the left sub-screen 172 as shown in FIG. 25. In this controlling method, it is detected whether the movable case 6 is in the opened state or closed state (step S31) and, in the case of the opened state, the left/right rotation angle is detected and determined (step S32).

In the opened state, if the rotation angle is zero degrees, a vertical main screen (vertical main display mode) is displayed as the above vertical screen (step S33); in the case of the right rotation, a right horizontal main screen (right horizontal main display mode) is displayed as the above horizontal screen (step S34); and in the case of the left rotation, a left horizontal main screen (left horizontal main display mode) is displayed as the above horizontal screen (step S35). In this case, the screen aspect is controlled to become the vertical screen layout correspondingly to the vertical main screen (vertical main display mode) and is switched to the horizontal screen layout for the right horizontal main screen (right horizontal main display mode) or the left horizontal main screen (left horizontal main display mode).

In the closed state, the left/right rotation angle is also detected and determined (step S36). If the rotation angle is zero degrees, nothing is displayed (step S37); in the case of the right direction, the right sub-screen (sub-display mode) is displayed (step S38); and in the case of the left direction, the left sub-screen (sub-display mode) is displayed (step S39).

In the switching of the screen display of the displaying unit 18, as shown in FIG. 26, if the movable case 6 is in the closed state and the rotation angle is zero degrees, the movable case 6 is located at the center position and is in a state 1, and nothing is displayed (ST1). If this non-display state (state 1) is shifted to a state 2 where the movable case 6 is in the opened state and the rotation state is zero degrees, the vertical main display mode is initiated (ST2); if the vertical main display mode is shifted to a state 3 where the rotation state is right rotation, the right horizontal main display mode is initiated (ST3); and if the vertical main display mode is shifted to a state 4 where the rotation state is left rotation, the left horizontal main display mode is initiated (ST4). The screen aspect is switched to the vertical screen layout for the vertical main display mode of the state 2, the horizontal screen layout for the right horizontal main display mode of the state 3, and the horizontal screen layout for the left horizontal main display mode of the state 4 to perform the screen display.

If the non-display state (state 1) is shifted to a state 5 by rotating the movable case 6 to the right or left, the sub-display mode is initiated (ST5). The sub-display mode includes the right sub-display mode and the left sub-display mode depending on the rotation direction.

If the movable case 6 is closed during the state 3 (right horizontal main display mode) or the state 4 (left horizontal main display mode), the state is shifted to a state 5 (sub-display mode).

Since the modes can be switched in this way, when the movable case 6 is in a rotated state, the right horizontal main display mode or left horizontal main display mode can be shifted to the sub-display mode and the sub display mode can be shifted to the right horizontal main display mode or left horizontal main display mode by opening/closing the movable case 6. Specifically, the right horizontal main display mode can be switched to the right sub-display mode, and the left horizontal main display mode can be switched to the left sub-display mode.

The switching of the displaying unit 18 is performed by the control program of the displaying unit 18 as shown in FIG. 27. In the process procedures of the control program, the displaying unit 18 is control to become the non-display state in the state 1 (non-display) (step S41). If the detection information of the opened state is loaded from the open/close sensor 112 (step S42) and the movable case 6 is in the rotation state of zero degrees, the state 1 is shifted to the state 2 to perform the vertical main display mode and, for example, the vertical main screen is deployed on the displaying unit 18 (step S43).

While the vertical main display mode is performed, if the rotation sensors 42, 44 detect the right rotation of the movable case 6 and the detection information is loaded (step S44), the state is shifted to the state 3 to perform the right horizontal main display mode and, for example, the horizontal main screen is deployed on the displaying unit 18 (step S45).

While the right horizontal main display mode is performed, if the open/close sensor 112 detects the closed state of the movable case 6 and the detection information is loaded (step S46), the state is shifted to the state 5 to perform the sub-display mode and, for example, the right sub-screen 170 (FIG. 22) is deployed on the displaying unit 18 (step S47).

In the state 1 (non-display) (step S41), if the movable case 6 is rotated and the left or right rotation detection information is loaded from the rotation sensors 42, 44 (step S48), the state is shifted to the state 5 to perform the sub-display mode and, for example, the right sub-screen 170 (FIG. 22) or the left sub-screen 172 (FIG. 23) is deployed on the displaying unit 18 (step S49).

While the sub-display mode is performed, if the movable case 6 is put into the opened state, which is detected by the open/close sensor 112, and the detection information of the opened state is loaded (step S50), the rotation detection information is acquired from the rotation sensors 42, 44 (steps S44 and S51).

If the detection-information of the left-rotation of the movable case 6 is loaded from the rotation sensors 42, 44 (step S51), the state is shifted to the state 4 to perform the left horizontal main display mode and, for example, the horizontal main screen is deployed on the displaying unit 18 (step S52).

While the left horizontal main display mode is performed, if the rotation detection information indicating zero degrees is loaded from the rotation sensors 42, 44 (step S53), the state is shifted to the state 2 to perform the vertical main display mode and the vertical main screen is deployed on the displaying unit 18 (step S54).

In the process procedures, at step S43, the rotation of the movable case 6 is monitored (step S51); if the detection information indicating the left rotation is acquired from the rotation sensors 42, 44, the process goes to step S52; at step S45, the rotation of the movable case 6 is monitored (step S53); and if the rotation sensors 42, 44 detect the rotation state of zero degrees, the process goes to step S54. At step S50, the rotation of the movable case 6 is monitored (step S44); if the detection information indicating the right rotation is acquired from the rotation sensors 42, 44, the process goes to step S45; at step S52, opening/closing of the movable case 6 is monitored (step S46); and if the detection information indicating the closed state is acquired from the open/close sensor 112, the process goes to step S47.

In such an embodiment, the vertical screen layout can be applied to the vertical screen and the horizontal screen layout can be applied to the horizontal screen to achieve improvement of visibility of the screen contents of the vertically elongated vertical screen and the horizontally elongated horizontal screen, etc.

Fourth Embodiment

Figure 28:
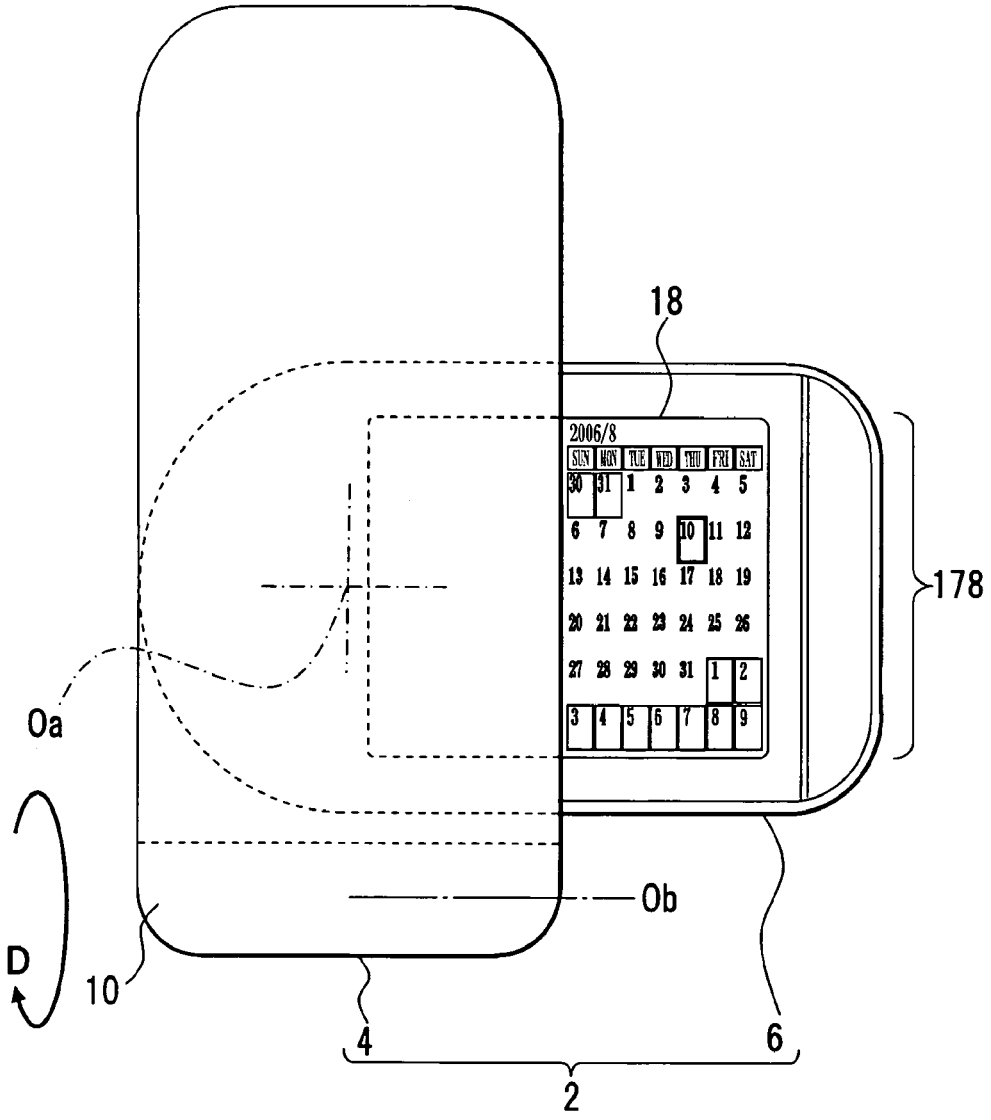
FIG. 28 depicts an example of a sub-vertical screen display of a portable terminal apparatus according to a fourth embodiment.
Figure 29:
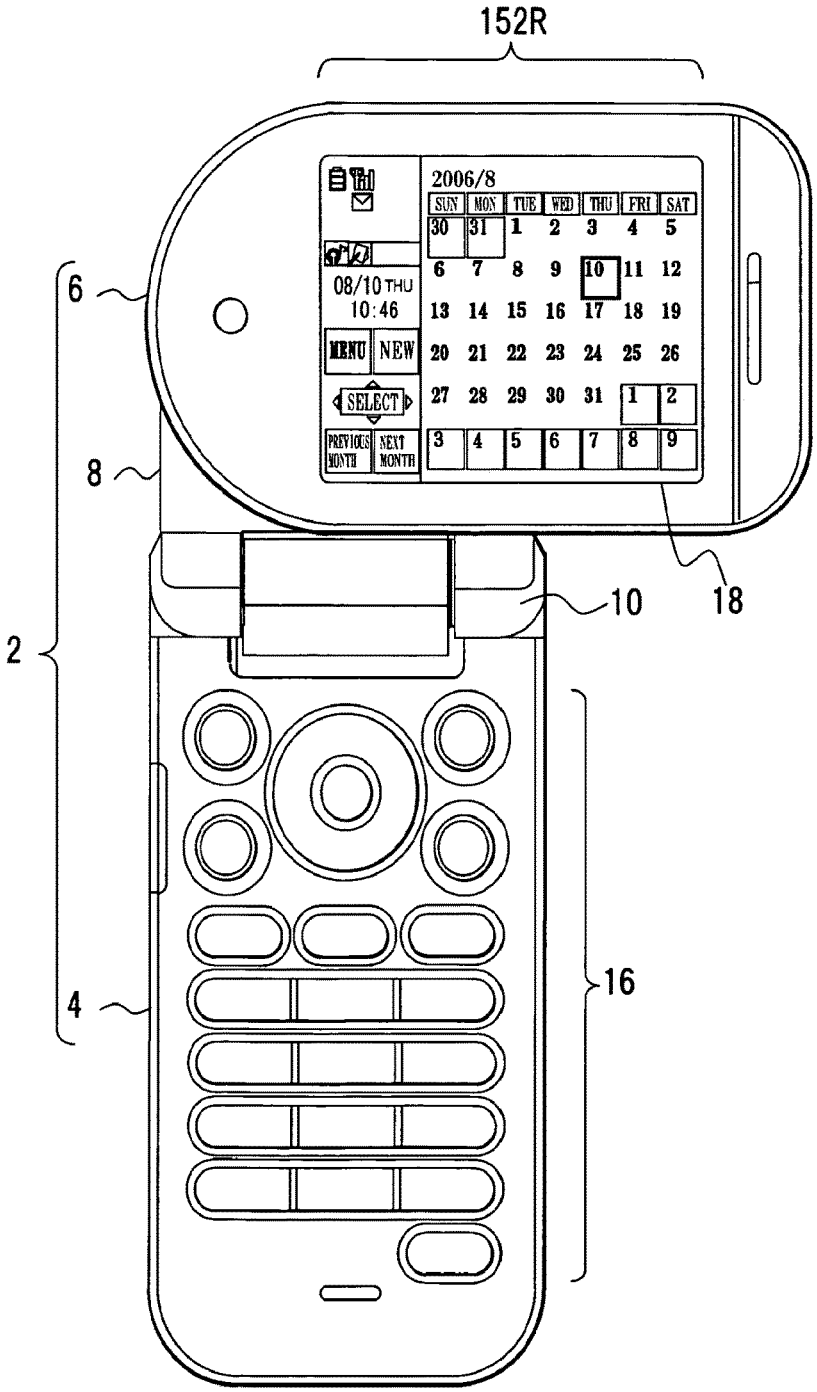
FIG. 29 depicts an example of a horizontal screen display of the portable terminal apparatus.

A fourth embodiment will be described with reference to FIGS. 28 and 29. FIG. 28 depicts an example of a sub-vertical screen display and FIG. 29 depicts an example of a horizontal screen display. In FIGS. 28 and 29, the same reference numerals are added to the same portions as FIGS. 1 to 27.

In this embodiment, the portable terminal apparatus 2 shown in FIGS. 1 to 4 and 6 to 12 is used. That is, as shown in FIG. 21 (the third embodiment), in the portable terminal apparatus 2, the movable case 6 can be rotated around the rotation center Oa of the rotation module 12 to the right (an arrow A) or left (an arrow B) while the movable case 6 is folded onto the fixed case 4, i.e., in the closed state. As shown by solid lines, the partial display area 164 of the displaying unit 18 of the movable case 6 can be viewed from backside of the fixed case 4 at the right rotated position b.

In the fourth embodiment, by rotating the movable case 6 in the closed state to the right, for example, a sub-vertical screen 178 (FIG. 28) is displayed as a vertical screen, and if the movable case 6 is opened by rotating the movable case 6 around a rotation center Ob of the hinge 10 to a direction of an arrow D, the horizontal screen 152R (FIG. 29) is displayed. In the schedule mode, a vertically elongated display area 164 is displayed on the sub-vertical screen 178 as a vertical screen for the same information, and the display aspect is controlled to become a sub-vertical screen layout. Since the entire displaying unit 18 is exposed on the movable case 6 as shown in FIG. 29 by opening the movable case 6 from the closed state, the horizontally elongated horizontal screen 152R is displayed and the display aspect is controlled to become the horizontal screen layout. In this case, while the sub-vertical screen layout displays only a calendar corresponding to the vertical main display field 126 (FIGS. 14 and 17), the horizontal screen layout displays the horizontal screen 152R (FIG. 15). The contents of the horizontal screen 152R have been described above.

Although the movable case 6 is rotated to the right in this embodiment, the same applies to the left rotation of the movable case 6; the sub-vertical screen 178 as a vertical screen is displayed by rotating the movable case 6 in the closed state to the left; and the horizontal screen 152L (FIG. 16) is displayed by putting the movable case 6 into the opened state. The aspects of the sub-vertical screen layout and the horizontal screen layout are the same as those in the case of the right rotation.

Figure 30:
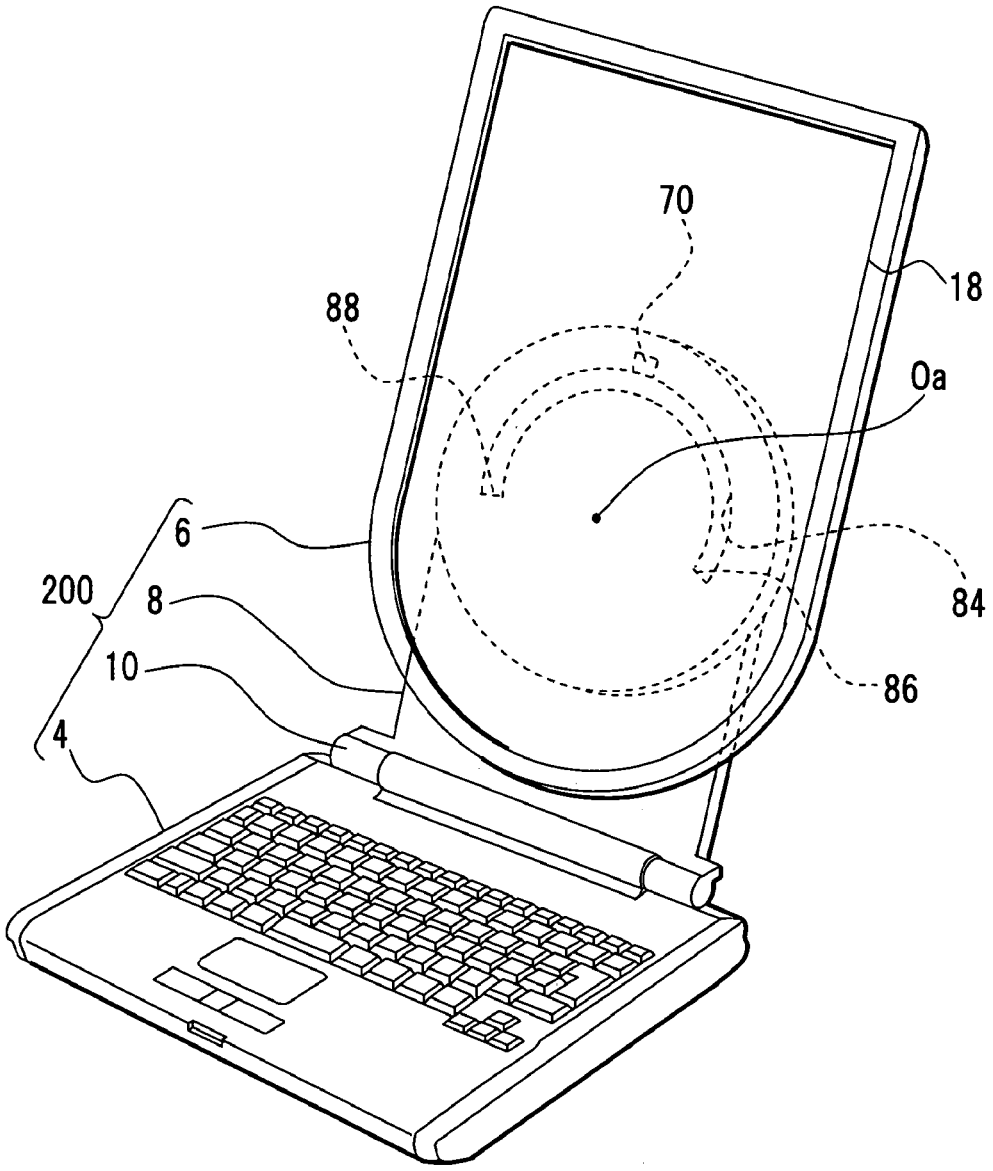
FIG. 30 depicts a PC (vertical screen display) according to another embodiment.
Figure 31:
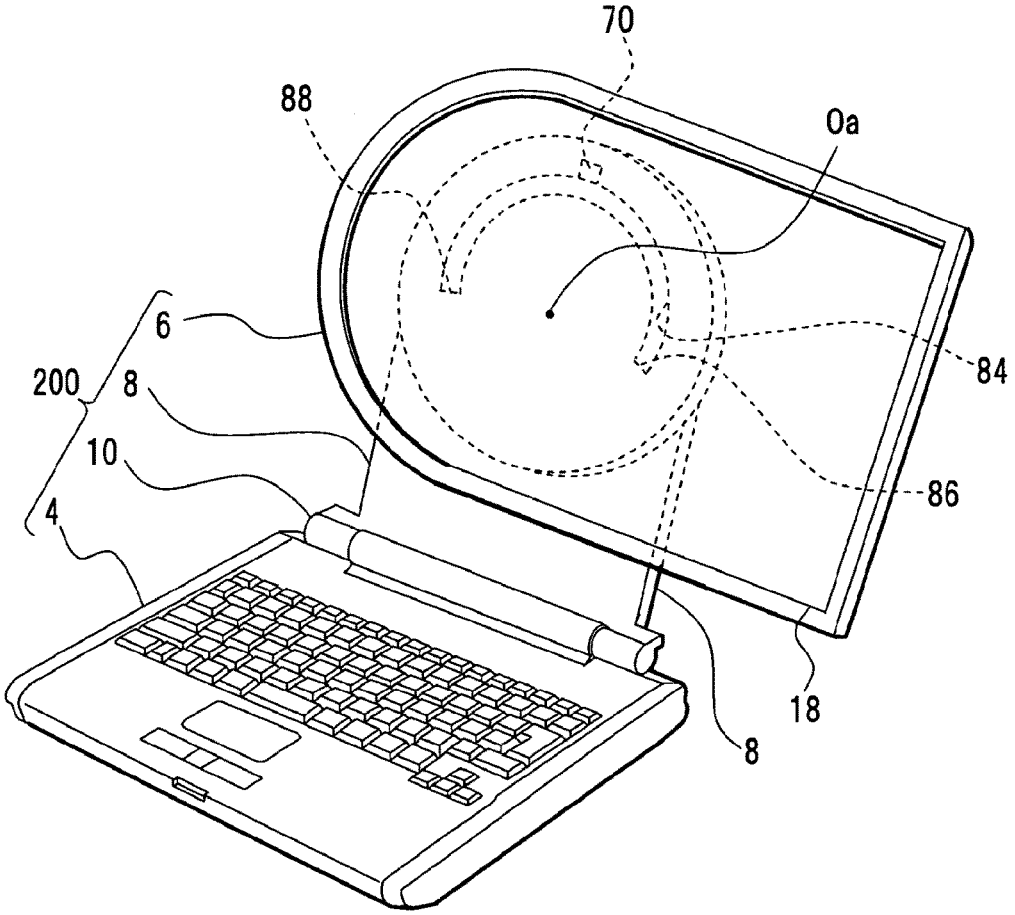
FIG. 31 depicts the PC (horizontal screen display) according to another embodiment.

Other Embodiments (1) Although the portable terminal apparatus 2 has been illustrated as the electronic device in the above embodiments, the present invention is applicable to a personal computer (PC). FIGS. 30 and 31 are perspective views of a PC; FIG. 30 depicts the case of maintaining the movable case 6 vertically elongated in the opened state; and FIG. 31 depicts the case of rotating the movable case 6 to the right and maintaining the movable case 6 horizontally elongated in the opened state. In FIGS. 30 and 31, the same reference numerals are added to the same portions as FIGS. 1 to 29.

This PC 200 includes the above mechanism (FIGS. 1 to 4 and 6 to 12) and electric circuit (FIG. 13), executes the above controlling method (FIGS. 5 and 20) and control program (FIGS. 25 and 27), and has the same display forms (FIGS. 14 to 17) to display the vertical screen 124 and the horizontal screen 152R; the vertically elongated vertical screen 124 is displayed on the displaying unit 18 by setting the movable case 6 to the vertical direction; the horizontally elongated horizontal screen 152R is displayed on the displaying unit 18 by rotating the movable case 6, for example, to the right to the horizontal direction; and the screen aspect can be displayed in the vertical screen layout for the vertical screen 124 and in the horizontal screen layout for the horizontal screen 152R. In this case, by rotating the movable case 6, for example, to the left to the horizontal direction, the screen layout can be switched to the horizontal screen layout to display the horizontally elongated horizontal screen 152L (e.g., FIG. 16) on the displaying unit 18.

(2) Although the portable terminal apparatus 2 and the PC 200 have been illustrated as the electronic device in the above embodiments, the present invention is applicable to remote-control apparatuses, game devices, etc., including a movable unit.

Although the most preferred embodiments, etc., of the present invention have been described as above, the present invention is not limited to the above description; it is obvious that various modifications and changes can be made by those skilled in the art based on the gist of the present invention described in the claims or disclosed in the specification; and it is needless to say that such modifications and changes are within the range of the present invention.

The present invention relates to an electronic device such as a portable terminal apparatus including a display function in a rotatable and/or openable/closable case, and is useful because if the screen aspect is changed from the vertical screen to the horizontal screen, from the horizontal screen to the vertical screen, etc., the layout is changed for each screen; the screen configuration is optimized; visibility and usability of the screen display can be improved; and functionality can be reinforced since the function corresponding to the screen can be launched.

What is claimed is:

1. An electronic device including a display function in a rotatable and/or openable/closable case, the device comprising:

a [displaying unit] *display* that displays a vertically elongated vertical screen or a horizontally elongated horizontal screen; [and]

a controlling unit *that includes a central processing unit and a memory unit and* that changes screen layouts correspondingly to the vertical screen or the horizontal screen displayed on the [displaying unit,] *display;*

*a movable arm that is supported by a fixed case in an openable/closable manner; and*

*a movable case that is rotatably supported by the movable arm, wherein the display is disposed on the movable case and is rotated or opened/closed,* wherein *one or both of the movable arm and the movable case include a sensor that detects the rotation or opening/closing of the movable case,*

*the controlling unit displays a screen on an area of the display that protrudes from the fixed case when the movable case is in the closed state,* the controlling unit sets a first vertical display field and a second vertical display field, on the vertical screen, the first vertical display field displaying an image with a launched function, the second vertical display field displaying a mark, an icon, clock display or any combination thereof, the second vertical display field being arranged on the top of or on the bottom of the first vertical display field, [and]

the controlling unit sets a first horizontal display field and a second horizontal display field, on the horizontal screen, the first horizontal display field displaying, display contents corresponding to display contents of the first vertical display field, the second horizontal display field displaying display contents corresponding to display contents of the second vertical display field, the second horizontal display field being arranged at the side of the first horizontal display field horizontally, *and*

*the controlling unit further sets a third vertical display field on the vertical screen and sets a third horizontal display field on the horizontal screen, the third horizontal display field displaying display contents corresponding to display contents of the third vertical display field, the second horizontal display field and the third horizontal display field being arranged one above the other.*

2. The electronic device of claim 1, [further comprising:] *wherein*

[a sensor unit that detects the rotation or the opening/closing of the displaying unit, wherein] the controlling unit switches the [displaying unit] *display* to the vertical screen or the horizontal screen based on the rotation information or the open/close information acquired from the sensor [unit].

3. The electronic device of claim 1, wherein the controlling unit sets a reference position, and rotated positions or opened positions at a predetermined angle or more to the right and/or left for the [displaying unit] *display*, and wherein the screen form of the [displaying unit] *display* is switched to the vertical screen or the horizontal screen at the reference position and the rotated positions or the opened positions.

4. The electronic device of claim 1, wherein the change in the screen layout corresponding to the vertical screen or the horizontal screen includes a change in arrangement of icons.

5. The electronic device of claim 1, wherein the controlling unit launches the function assigned to the vertical screen or the horizontal screen correspondingly to the vertical screen or the horizontal screen on the [displaying unit] *display*.

[6. The electronic device of claim 1, further comprising:

a movable arm that is supported by a fixed case in an openable/closable manner; and a movable case that is rotatably supported by the movable arm, wherein the displaying unit is disposed on the movable case and is rotated or opened/closed.]

[7. The electronic device of claim 6, wherein one or both of the movable arm and the movable case include a sensor unit that detects the rotation or opening/closing of the movable case.]

8. A controlling method of an electronic device including a display function in a rotatable and/or openable/closable case, the method comprising:

*detecting, by a sensor, a rotation or an opening/closing of a movable case that is rotatably supported by a movable arm that is supported by a fixed case in an opening/closable manner;* displaying, on a [displaying unit] *display disposed on the movable case*, a vertically elongated vertical screen or a horizontally elongated horizontal screen; [and]

changing, by a controlling unit, screen layouts correspondingly to the vertical screen or the horizontal screen[.]*; and*

*displaying a screen on an area of the display that protrudes from the fixed case when the movable case is in the closed state,* wherein said changing the screen layouts includes setting a first vertical display field and a second vertical display field, on the vertical screen, the first vertical display field displaying an image with a launched function, the second vertical display field displaying a mark, an icon, clock display or any combination thereof, the second vertical display field being arranged on the top of or on the bottom of the first vertical display field, or setting a first horizontal display field and a second horizontal display field, on the horizontal screen, the first horizontal display field displaying display contents corresponding to display contents of the first vertical display field, the second horizontal display field displaying display contents corresponding to display contents of the second vertical display field, the second horizontal display field being arranged at the side of the first horizontal display field horizontally, *and*

*wherein said changing the screen layouts further includes setting a third vertical display field on the vertical screen, or setting a third horizontal display field on the horizontal screen, the third horizontal display field displaying display contents corresponding to display contents of the third vertical display field, the second horizontal display field and the third horizontal display field being arranged one above the other.*

9. The controlling method of an electronic device of claim 8, [comprising:] *wherein*

[detecting, by a sensor unit, the rotation or the opening/closing, wherein] switching to the vertical screen or the horizontal screen is performed by the controlling unit based on the rotation information or the open/close information acquired from the sensor [unit].

10. The controlling method of an electronic device of claim 8, comprising:

setting, by the controlling unit, a reference position, and rotated positions or opened positions at a predetermined angle or more to the right and/or left for the [displaying unit] *display* and switching a screen form of the [displaying unit] *display* to the vertical screen or the horizontal screen at the reference position and the rotated positions or the opened positions.

11. The controlling method of an electronic device of claim 8, wherein the change in the screen layout corresponding to the vertical screen or the horizontal screen includes a change in arrangement of icons.

12. The controlling method of an electronic device of claim 8, comprising:

launching, by the controlling unit, the function assigned to the vertical screen or the horizontal screen correspondingly to the vertical screen or the horizontal screen on the [displaying unit] *display*.

13. A *non-transitory* recording medium storing a computer-readable control program of an electronic device including a display function in a rotatable and/or openable/closable case, the program being executed by a computer, the program comprising:

*detecting a rotation or an opening/closing of a movable case that is rotatably supported by a movable arm that is supported by a fixed case in an openable/closable manner;* displaying a vertically elongated vertical screen or a horizontally elongated horizontal screen; [and]

changing screen layouts correspondingly to the vertical screen or the horizontal screen[.]*; and*

*displaying a screen on an area that protrudes from the fixed case when the movable case is in the closed state;* wherein said changing the screen layouts includes setting a first vertical display field and a second vertical display field, on the vertical screen, the first vertical display field displaying an image with a launched function, the second vertical display field displaying a mark, an icon, clock display or any combination thereof, the second vertical display field being arranged on the top of or on the bottom of the first vertical display field, or setting a first horizontal display field and a second horizontal display field, on the horizontal screen, the first horizontal display field displaying display contents corresponding to display contents of the first vertical display field, the second horizontal display field displaying display contents corresponding to display contents of the second vertical display field, the second horizontal display field being arranged at the side of the first horizontal display field horizontally, *and*

*wherein said changing the screen layouts further includes setting a third vertical display field on the vertical screen, or setting a third horizontal display field on the horizontal screen, the third horizontal display field displaying display contents corresponding to display contents of the third vertical display field, the second horizontal display field and the third horizontal display field being arranged one above the other.*

14. The recording medium storing a computer-readable control program of an electronic device of claim 13, [the program further comprising:] *wherein*

[detecting the rotation or the opening/closing, wherein] switching to the vertical screen or the horizontal screen is performed based on the rotation information or the open/close information.

15. The recording medium storing a computer-readable control program of an electronic device of claim 13, the program further comprising:

setting a reference position, and rotated positions or opened positions at a predetermined angle or more to the right and/or left and switching to the vertical screen or the horizontal screen at the reference position and the rotated positions or the opened positions.

16. The recording medium storing a computer-readable control program of an electronic device of claim 13, wherein the change in the screen layout corresponding to the vertical screen or the horizontal screen includes a change in arrangement of icons.

17. The recording medium storing a computer-readable control program of an electronic device of claim 13, the program further comprising:

launching the function assigned to the vertical screen or the horizontal screen correspondingly to the vertical screen or the horizontal screen.

* * * * *